United States Patent
Li et al.

(10) Patent No.: US 11,838,494 B2
(45) Date of Patent: Dec. 5, 2023

(54) IMAGE PROCESSING METHOD, VR DEVICE, TERMINAL, DISPLAY SYSTEM, AND NON-TRANSITORY COMPUTER-READABLE STORAGE MEDIUM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Wenyu Li, Beijing (CN); Hao Zhang, Beijing (CN); Lili Chen, Beijing (CN); Jinghua Miao, Beijing (CN)

(73) Assignees: Beijing Boe Optoelectronics Technology Co., LTD., Beijing (CN); Boe Technology Group Co., LTD., Beijing (CN)

( * ) Notice: Subject to any disclaimer, the term of this patent is extended or adjusted under 35 U.S.C. 154(b) by 0 days.

(21) Appl. No.: 17/782,385

(22) PCT Filed: Apr. 13, 2021

(86) PCT No.: PCT/CN2021/086797
§ 371 (c)(1),
(2) Date: Jun. 3, 2022

(87) PCT Pub. No.: WO2021/223016
PCT Pub. Date: Nov. 25, 2021

(65) Prior Publication Data
US 2023/0023903 A1 Jan. 26, 2023

(30) Foreign Application Priority Data
May 20, 2020 (CN) .......................... 202010432109.8

(51) Int. Cl.
H04N 13/344 (2018.01)
H04N 13/383 (2018.01)
(Continued)

(52) U.S. Cl.
CPC ......... *H04N 13/344* (2018.05); *H04N 13/122* (2018.05); *H04N 13/25* (2018.05); *H04N 13/383* (2018.05)

(58) Field of Classification Search
CPC .... H04N 13/344; H04N 13/122; H04N 13/25; H04N 13/383; H04N 13/239; H04N 13/106; H04N 13/332; H04N 13/398
See application file for complete search history.

(56) References Cited

U.S. PATENT DOCUMENTS 10,185,212 B1 1/2019 Chung et al.
2011/0149050 A1 6/2011 Imada
(Continued)

FOREIGN PATENT DOCUMENTS

AU 1999037325 A 12/1999
CN 102124749 A 7/2011
(Continued)

OTHER PUBLICATIONS

Notification to Grant Patent Right for Invention issued by the Chinese patent Office for application No. 202010432109.8 dated Jan. 11, 2022.
(Continued)

*Primary Examiner* — Douglas M Wilson
(74) *Attorney, Agent, or Firm* — IP & T GROUP LLP

(57) ABSTRACT

An image processing method includes: acquiring a fixation point position on a respective screen viewed by each of dominant eye(s); determining a fixation area of a left-eye screen and a fixation area of a right-eye screen according to fixation point position(s) corresponding to the dominant
(Continued)

eye(s); rendering a first part of a left-eye image to be displayed on the left-eye screen at a first resolution, and rendering a second part of the left-eye image at a second resolution; rendering a first part of a right-eye image to be displayed on the right-eye screen at a third resolution, and rendering a second part of the right-eye image at a fourth resolution. A resolution of an image to be displayed in a fixation area of the respective screen is greater than resolutions of images to be displayed in other areas of the left-eye screen and the right-eye screen.

16 Claims, 13 Drawing Sheets

(51) Int. Cl.
  *H04N 13/25* (2018.01)
  *H04N 13/122* (2018.01)

(56) References Cited

U.S. PATENT DOCUMENTS

| | | | |
|---|---|---|---|
| 2013/0050183 A1* | 2/2013 | Wang | H04N 13/161 |
| | | | 345/419 |
| 2014/0098343 A1 | 4/2014 | Haddadi | |
| 2014/0232630 A1 | 8/2014 | Plaehn | |
| 2015/0042558 A1 | 2/2015 | Massonneau et al. | |
| 2016/0147302 A1 | 5/2016 | Choi | |
| 2017/0050542 A1 | 2/2017 | Shigeta et al. | |
| 2017/0178408 A1* | 6/2017 | Bavor, Jr. | G06T 19/006 |
| 2017/0330496 A1 | 11/2017 | Oravainen | |
| 2018/0035097 A1 | 2/2018 | Ohishi et al. | |
| 2018/0096461 A1 | 4/2018 | Okayama et al. | |
| 2019/0317599 A1 | 10/2019 | Akenine-Moller et al. | |
| 2020/0120322 A1* | 4/2020 | Ogasawara | H04N 13/122 |
| 2020/0183166 A1 | 6/2020 | Dai et al. | |
| 2021/0333870 A1 | 10/2021 | Wang et al. | |

FOREIGN PATENT DOCUMENTS

| | | |
|---|---|---|
| CN | 103429141 A | 12/2013 |
| CN | 107516335 A | 12/2017 |
| CN | 107533761 A | 1/2018 |
| CN | 107831594 A | 3/2018 |
| CN | 207704137 U | 8/2018 |
| CN | 108665521 A | 10/2018 |
| CN | 109564704 A | 4/2019 |
| CN | 109766011 A | 5/2019 |
| CN | 110347265 A | 10/2019 |
| CN | 111556305 A | 8/2020 |
| JP | 201177679 A | 4/2011 |
| JP | 2014-27351 A | 2/2014 |
| WO | 2014178477 A1 | 11/2014 |
| WO | 2018086295 A1 | 5/2018 |

OTHER PUBLICATIONS

First Office Action issued by the Chinese patent Office fpr application No. 202010432109.8 dated Jun. 29, 2021.
Wang Weimin and Li Yingjun.; Relationship between dominant eye and pupil size; Chinese Community Doctors; 2018; vol. 34, Issue 7.

* cited by examiner

IMAGE PROCESSING METHOD, VR DEVICE, TERMINAL, DISPLAY SYSTEM, AND NON-TRANSITORY COMPUTER-READABLE STORAGE MEDIUM

CROSS-REFERENCE TO RELATED APPLICATIONS

This application is a national phase entry under 35 USC 371 of International Patent Application No. PCT/CN2021/086797, filed on Apr. 13, 2021, which claims priority to Chinese Patent Application No. 202010432109.8, filed on May 20, 2020, which are incorporated herein by reference in their entirety.

TECHNICAL FIELD

The present disclosure relates to the field of image processing technologies, and in particular, to image processing methods, a VR device, a terminal, a display system, and a non-transitory computer-readable storage medium.

BACKGROUND

Virtual reality (VR) technology is a three-dimensional (3D) display technology, which is basically implemented by using a computer to simulate a virtual environment, so as to give the user a sense of immersion in the environment. The VR technology takes advantage of the parallax of the human eyes, and provides two eyes with images having certain differences. As a result, the brain produces a three-dimensional experience close to reality after the eyes acquire the images having differences.

SUMMARY

In an aspect, an image processing method is provided. The image processing method includes: acquiring a fixation point position on a respective screen viewed by each of dominant eye(s) of a user, the dominant eye(s) including at least one of a left eye and a right eye of the user;
   determining a fixation area of a left-eye screen and a fixation area of a right-eye screen according to fixation point position(s) corresponding to the dominant eye(s);
   rendering a first part of a left-eye image to be displayed on the left-eye screen at a first resolution, and rendering a second part of the left-eye image at a second resolution, the first part of the left-eye image being a part of the left-eye image to be displayed in the fixation area of the left-eye screen, the second part of the left-eye image being a part of the left-eye image other than the first part, and the first resolution being greater than the second resolution; and
   rendering a first part of the right-eye image to be displayed on the right-eye screen at a third resolution, and rendering a second part of the right-eye image at a fourth resolution, the first part of the right-eye image being a part of the right-eye image to be displayed in the fixation area of the right-eye screen, the second part of the right-eye image being a part of the right-eye image other than the first part, and the third resolution being greater than the fourth resolution. A resolution of an image to be displayed in a fixation area of the respective screen is greater than resolutions of images to be displayed in other areas of the left-eye screen and the right-eye screen.

In some embodiments, the dominant eye(s) include the left eye of the user; the third resolution is greater than the second resolution and less than the first resolution, and/or the fourth resolution is less than the second resolution.

In some other embodiments, the dominant eye(s) include the right eye of the user; the first resolution is greater than the fourth resolution and less than the third resolution, and/or the second resolution is less than the fourth resolution.

In some other embodiments, the dominant eye(s) include the left eye and the right eye of the user; the third resolution is equal to the first resolution, and the fourth resolution is equal to the second resolution.

In some other embodiments, in a case where the dominant eye(s) include one dominant eye, the dominant eye being the left eye of the user, the image processing method further includes: reducing the first resolution according to a level of the dominant eye to obtain the third resolution; and reducing the second resolution according to the level of the dominant eye to obtain the fourth resolution.

In some other embodiments, in a case where the dominant eye(s) include one dominant eye, the dominant eye being the right eye of the user, the image processing method further includes: reducing the third resolution according to the level of the dominant eye to obtain the first resolution; and reducing the fourth resolution according to the level of the dominant eye to obtain the second resolution.

In some embodiments, the image processing method further includes: displaying the rendered left-eye image on the left-eye screen, and displaying the rendered right-eye image on the right-eye screen.

In some other embodiments, the image processing method further includes: sending the rendered left-eye image and the rendered right-eye image to a VR device to be displayed by the VR device.

In some embodiments, the image processing method further includes: determining the dominant eye(s) of the user; and
   sending a control instruction to a VR device according to the determined dominant eye(s) of the user, so as to control the VR device to acquire eyeball image(s) of the dominant eye(s), the eyeball images) being used to determine the fixation point position(s).

In some embodiments, the image processing method further includes: displaying a dominant eye test image on the left-eye screen and the right-eye screen, respectively.

In some other embodiments, the image processing method further includes: sending the dominant eye test image to a VR device to be displayed by the VR device.

In another aspect, some embodiments of the present disclosure provide an image processing method. The image processing method includes:
   acquiring eyeball image(s) of dominant eye(s) of a user, the dominant eye(s) including at least one of a left eye and a right eye of the user; and
   calculating a fixation point position on a respective screen viewed by each of the at least one dominant eye according to the eyeball image(s).

In some embodiments, the image processing method further includes: sending fixation point position(s) corresponding to the dominant eye(s) to a terminal, the fixation point position(s) being used to determine a fixation area of a left-eye screen and a fixation area of a right-eye screen.

In some embodiments, the image processing method further includes: receiving a left-eye image to be displayed on the left-eye screen and a right-eye image to be displayed on the right-eye screen, the left-eye image including a first part and a second part, a resolution of the first part of the left-eye image being a first resolution, the first part of the left-eye image being used to be displayed in the fixation area of the left-eye screen, a resolution of the second part of the left-eye image being a second resolution, the second part of the left-eye image being a part of the left-eye image other than the first part, the first resolution being greater than the second resolution, the right-eye image including a first part and a second part, a resolution of the first part of the right-eye image being a third resolution, the first part of the right-eye image being used to be displayed in the fixation area of the right-eye screen, a resolution of the second part of the right-eye image being a fourth resolution, the second part of the right-eye image being a part of the right-eye image other than the first part, and the third resolution being greater than the fourth resolution; and displaying the left-eye image on the left-eye screen, and displaying the right-eye image on the right-eye screen.

In some embodiments, the image processing method further includes: determining a fixation area of a left-eye screen and a fixation area of a right-eye screen according to fixation point position(s) corresponding to the dominant eye(s);

rendering a first part of a left-eye image to be displayed on the left-eye screen at a first resolution, and rendering a second part of the left-eye image at a second resolution, the first part of the left-eye image being a part of the left-eye image to be displayed in the fixation area of the left-eye screen, the second part of the left-eye image being a part of the left-eye image other than the first part, and the first resolution being greater than the second resolution;

rendering a first part of the right-eye image to be displayed on the right-eye screen at a third resolution, and rendering a second part of the right-eye image at a fourth resolution, the first part of the right-eye image being a part of the right-eye image to be displayed in the fixation area of the right-eye screen, the second part of the right-eye image being a part of the right-eye image other than the first part, the third resolution being greater than the fourth resolution, and a resolution of an image to be displayed in a fixation area of the respective screen being greater than resolutions of images to be displayed in other areas of the left-eye screen and the right-eye screen; and displaying the rendered left-eye image on the left-eye screen, and displaying the rendered right-eye image on the right-eye screen.

In some embodiments, acquiring the eyeball image(s) of the dominant eye(s) of the user includes: receiving a control instruction sent by a terminal, and acquiring the eyeball image(s) of the dominant eye(s) of the user according to the control instruction.

In some other embodiments, acquiring the eyeball image(s) of the dominant eye(s) of the user includes: determining the dominant eye(s) of the user, and acquiring the eyeball image(s) of the dominant eye(s) of the user according to the determined result.

In some embodiments, the image processing method further includes: displaying a dominant eye test image on a left-eye screen and a right-eye screen, respectively.

In yet another aspect, some embodiments of the present disclosure provide an image processing method. The image processing method includes:

determining dominant eye(s) of a user, the dominant eye(s) including at least one of a left eye and a right eye of the user;

acquiring eyeball image(s) of the dominant eye(s) of the user;

obtaining a fixation point position on a respective screen viewed by each of the dominant eye(s) of the user;

determining a fixation area of a left-eye screen and a fixation area of a right-eye screen according to fixation point position(s) corresponding to the dominant eye(s);

rendering a first part of a left-eye image to be displayed on the left-eye screen at a first resolution, and rendering a second part of the left-eye image at a second resolution, the first part of the left-eye image being a part of the left-eye image to be displayed in the fixation area of the left-eye screen, the second part of the left-eye image being a part of the left-eye image other than the first part, and the first resolution being greater than the second resolution;

rendering a first part of the right-eye image to be displayed on the right-eye screen at a third resolution, and rendering a second part of the right-eye image at a fourth resolution, the first part of the right-eye image being a part of the right-eye image to be displayed in the fixation area of the right-eye screen, the second part of the right-eye image being a part of the right-eye image other than the first part, the third resolution being greater than the fourth resolution, and a resolution of an image to be displayed in a fixation area of the respective screen being greater than resolutions of images to be displayed in other areas of the left-eye screen and the right-eye screen; and displaying the rendered left-eye image on the left-eye screen, and displaying the rendered right-eye image on the right-eye screen.

In some embodiments, the dominant eye(s) include the left eye of the user; the third resolution is greater than the second resolution and less than the first resolution, and/or the fourth resolution is less than the second resolution.

In some other embodiments, the dominant eye(s) include the right eye of the user; the first resolution is greater than the fourth resolution and less than the third resolution, and/or the second resolution is less than the fourth resolution.

In some other embodiments, the dominant eye(s) include the left eye and the right eye of the user; the third resolution is equal to the first resolution, and the fourth resolution is equal to the second resolution.

In some embodiments, in a case where the dominant eye(s) include one dominant eye, the dominant eye being the left eye of the user, the image processing method further includes: reducing the first resolution according to a level of the dominant eye to obtain the third resolution; and reducing the second resolution according to the level of the dominant eye to obtain the fourth resolution.

In some other embodiments, in a case where the dominant eye(s) include one dominant eye, the dominant eye being the right eye of the user, the image processing method further includes: reducing the third resolution according to a level of the dominant eye to obtain the first resolution; and reducing the fourth resolution according to the level of the dominant eye to obtain the second resolution.

In yet another aspect, some embodiments of the present disclosure further provides a VR device. The VR device includes two cameras in one-to-one correspondence with a left eye and a right eye of a user, and at least one processor. The cameras are configured to acquire eyeball images of eyes corresponding to the cameras. The at least one processor is configured to control camera(s) corresponding to dominant eye(s) of the user to work, and calculate a fixation point position on a respective screen viewed by each of the dominant eye(s) according to eyeball image(s) acquired by camera(s). The dominant eye(s) includes at least one of the left eye and the right eye of the user.

In some embodiments, the VR device further includes: a communication device configured to send fixation point position(s) corresponding to the dominant eye(s) to a terminal. The fixation point positions) are used to determine a fixation area of a left-eye screen and a fixation area of a right-eye screen.

In some embodiments, the VR device further includes a left eye screen and a right eye screen.

The at least one processor is configured to: determine a fixation area of the left-eye screen and a fixation area of the right-eye screen according to the fixation point position(s) corresponding to the dominant eye(s) of the user; render a first part of a left-eye image to be displayed on the left-eye screen at a first resolution, and render a second part of the left-eye image at a second resolution, the first part of the left-eye image being a part of the left-eye image to be displayed in the fixation area of the left-eye screen, the second part of the left-eye image being a part of the left-eye image other than the first part, and the first resolution being greater than the second resolution; render a first part of a right-eye image to be displayed on the right-eye screen at a third resolution, and render a second part of the right-eye image at a fourth resolution, the first part of the right-eye image being a part of the right-eye image to be displayed in the fixation area of the right-eye screen, the second part of the right-eye image being a part of the right-eye image other than the first part, the third resolution being greater than the fourth resolution. A resolution of an image to be displayed in a fixation area of the respective screen is greater than resolutions of images to be displayed in other areas of the left-eye screen and the right-eye screen.

The at least one processor is further configured to control the left-eye screen to display the rendered left-eye image, and control the right-eye screen to display the rendered right-eye image.

In yet another aspect, some embodiments of the present disclosure provide a terminal. The terminal includes a memory and at least one processor. The memory is configured to store a computer program. The at least one processor is configured to execute the computer program stored in the memory when the terminal operates, so as to cause the terminal to perform any image processing method as described above.

In some embodiments, the terminal device further includes the left-eye screen and the right-eye screen. The at least one processor is further configured to control the left-eye screen to display the rendered left-eye image, and control the right-eye screen to display the rendered right-eye image.

In some other embodiments, the terminal further includes a first communication device configured to send the rendered left-eye image and the rendered right-eye image to a VR device to be displayed by the VR device.

In some embodiments, the at least one processor is further configured to determine dominant eye(s) of the user. The terminal further includes a second communication device configured to send a control instruction to a VR device according to the determined dominant eye(s) of the user, the control instruction being used to control the VR device to acquire eyeball image(s) of the dominant eye(s), and the eyeball image(s) being used to determine fixation point position(s).

In yet another aspect, some embodiments of the present disclosure provide a display system. The display system includes:
two cameras in one-to-one correspondence with a left eye and a right eye of a user, the cameras being configured to acquire eyeball images of eyes corresponding to the cameras;
a left-eye screen and a right-eye screen; and
at least one processor configured to: control camera(s) corresponding to dominant eye(s) of the user, and calculate a fixation point position on a respective screen viewed by each of the dominant eye(s) according to eyeball image(s) acquired by the camera(s), the dominant eye(s) including at least one of the left eye and the right eye of the user; determine a fixation area of the left-eye screen and a fixation area of the right-eye screen according to fixation point position(s) corresponding to the dominant eye(s) of the user, render a left-eye image to be displayed on the left-eye screen according to the fixation area of the left-eye screen, and render a right-eye image to be displayed on the right-eye screen according to the fixation area of the right-eye screen; and control the left-eye screen to display the rendered left-eye image, and control the right-eye screen display the rendered right eye-image.

The at least one processor is configured to render the left-eye image to be displayed on the left-eye screen according to the fixation area of the left-eye screen, and render the right-eye image to be displayed on the right-eye screen according to the fixation area of the right-eye screen, includes the at least one processor is configured to:
render a first part of the left-eye image to be displayed on the left-eye screen at a first resolution, and render a second part of the left-eye image at a second resolution, the first part of the left-eye image being a part of the left-eye image to be displayed in the fixation area of the left-eye screen, the second part of the left-eye image being a part of the left-eye image other than the first part, and the first resolution being greater than the second resolution; and
render a first part of the right-eye image to be displayed on the right-eye screen at a third resolution, and render a second part of the right-eye image at a fourth resolution, the first part of the right-eye image being a part of the right-eye image to be displayed in the fixation area of the right-eye screen, the second part of the right-eye image being a part of the right-eye image other than the first part, the third resolution being greater than the fourth resolution, and a resolution of an image to be displayed in a fixation area of the respective screen being greater than resolutions of images to be displayed in other areas of the left-eye screen and the right-eye screen.

In yet another aspect, some embodiments of the present disclosure provide a non-transitory computer-readable storage medium storing therein a computer program. When run on a terminal, the computer program causes the terminal to perform any image processing method as described above.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
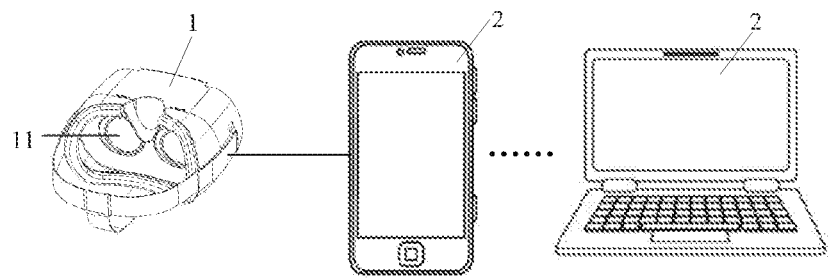
FIG. 1 is a structural diagram of a VR system, in accordance with some embodiments of the present disclosure.

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above term do not necessarily refer to the same embodiment(s) or examples(s). In addition, the specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, features defined with "first" and "second" may explicitly or implicitly include one or more of the features. In the description of the embodiments of the present disclosure, the term "a plurality of/the plurality of" means two or more unless otherwise specified.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining that" or "in response to detecting", depending on the context. Similarly, depending on the context, the phrase "if it is determined that" or "if [a stated condition or event] is detected" is optionally construed as "in a case where it is determined that", "in response to determining that", "in a case where [the stated condition or event] is detected", or "in response to detecting [the stated condition or event]".

The phase "applicable to" or "configured to" as used herein indicates an open and inclusive expression, which does not exclude devices that are applicable to or configured to perform additional tasks or steps.

In addition, the phrase "based on" as used herein is meant to be open and inclusive, since a process, a step, a calculation or other action that is "based on" one or more of the stated conditions or values may, in practice, be based on additional conditions or values exceeding those stated.

As used herein, the terms such as "about" or "approximately" includes a stated value and an average value within an acceptable deviation range of a specific value. The acceptable deviation range is determined by a person of ordinary skill in the art in view of the measurement in question and the error associated with the measurement of a particular quantity (i.e. limitations of the measurement system).

Exemplary embodiments are described herein with reference to sectional views and/or plan views as idealized exemplary accompanying drawings. In the accompanying drawings, thicknesses of layers and sizes of regions are enlarged for clarity. Thus, variations in shape relative to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown in a rectangular shape generally has a feature of being curved. Therefore, the regions shown in the accompanying drawings are schematic in nature, and their shapes are not intended to show actual shapes of the regions in a device, and are not intended to limit the scope of the exemplary embodiments.

Three-dimensional (3D) imaging technology is a technology that relies on the visual difference between two eyes to realize display. Based on the 3D imaging technology, VR technology gives people a strong sense of immersion and three-dimensional feeling. More importantly, VR technology allows users to interact with the displayed virtual world.

Based on the VR technology, some embodiments of the present disclosure provide a VR system. Referring to FIG. 1, the VR system includes a VR device 1 and a terminal 2, which may be connected by wired communication or wireless communication. The VR device 1 may be a wearable VR device, for example, a VR head mounted display (HMD), a VR helmet, VR glasses, etc. The terminal 2 may be a computer, a notebook computer, a personal digital assistant (PDA), a mobile phone, etc.

Figure 2:
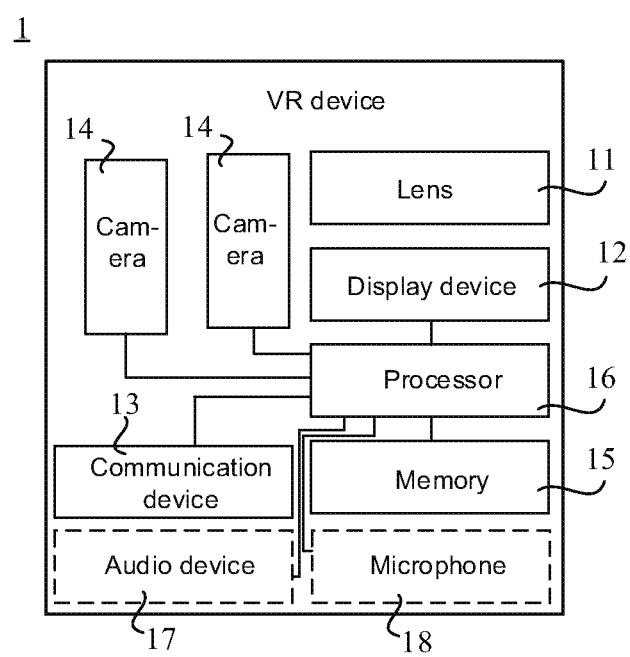
FIG. 2 is a structural diagram of a VR device, in accordance with some embodiments of the present disclosure.

In some embodiments, referring to FIG. 2, the VR device 1 may include a lens 11, a display device 12, at least one communication device 13, two cameras 14, at least one memory 15, and at least one processor 16.

The lens 11 may include two lenses, for example, two Fresnel lenses, which are used for viewing with a left eye and a right eye, respectively. The two lenses may be provided separately or integrally.

Figure 3A:
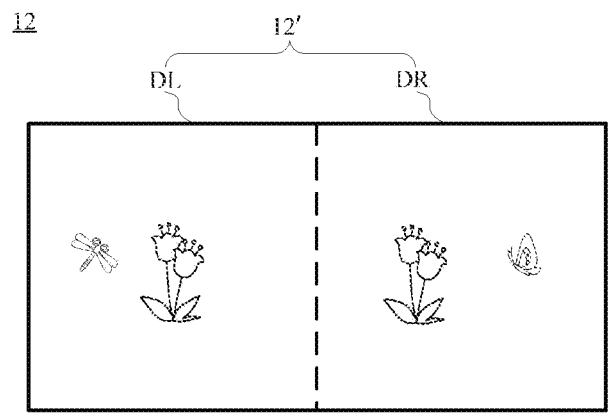
FIG. 3A is a structural diagram of a left-eye screen and a right-eye screen, in accordance with some embodiments of the present disclosure.
Figure 3B:
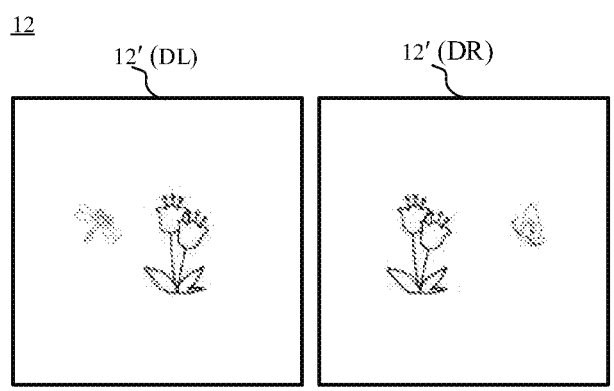
FIG. 3B is a structural diagram of a left-eye screen and a right-eye screen, in accordance with some other embodiments of the present disclosure.

Referring to FIGS. 3A and 3B, the display device 12 includes a left-eye screen DL and a right-eye screen DR, which are configured to display a left-eye image and a right-eye image, respectively. Resolutions of the left-eye screen DL and the right-eye screen DR may be, for example, 4K×4K, 8K×8K, 16K×16K, etc.

For example, referring to FIG. 3A, the display device 12 includes a display screen 12', and the left-eye screen DL and the right-eye screen DR are two parts of the display screen 12' that do not overlap. For another example, referring to FIG. 3B, the display device 12 may also include two separate display screens 12', the left-eye screen DL being one of the display screens 12', and the right-eye screen DR being another. The display screen 12' may be a liquid crystal display (LCD) screen, an organic light-emitting diode (OLED) display screen, a quantum dot light-emitting diode (QLED) display screen, and any other screens having a display function.

The communication device 13 is a device that exchanges information with an external device (e. g., the terminal 2). The communication device 13 is connected to one or more (at least two) processors 16, so as to send data or a command to the external device or to receive data or a command sent by the external device under the control of the processor 16. The communication device 13 may be a transceiver, a transceiver circuit, a transmitter, a receiver, etc. For example, the communication device 3 may be a wireless communication device such as a Wi-Fi device or a Bluetooth device, or a wired communication device such as a universal serial bus (USB) interface. The Wi-Fi device provides the VR device 1 with a network access that complies with Wi-Fi related standard protocols. The Bluetooth device may be an integrated circuit or a Bluetooth chip.

Figure 4A:
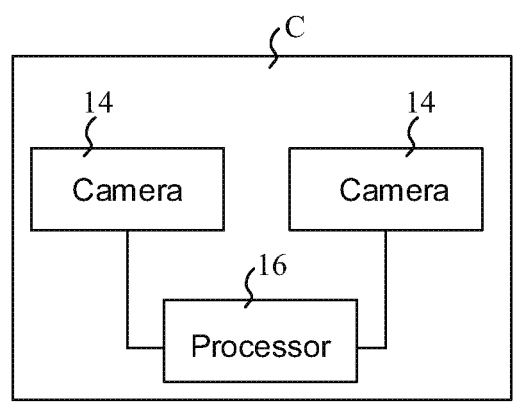
FIG. 4A is a structural diagram of a digital camera, in accordance with some embodiments of the present disclosure.
Figure 4B:
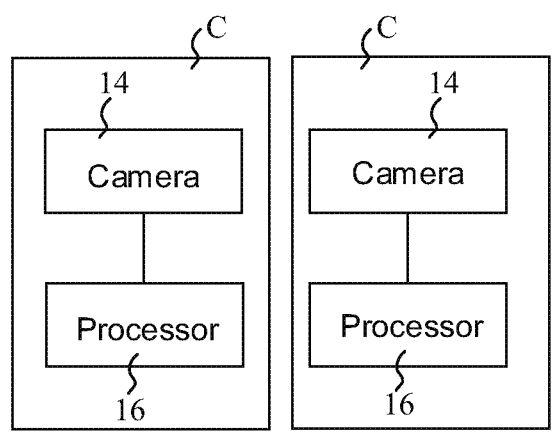
FIG. 4B is a structural diagram of another digital camera, in accordance with some embodiments of the present disclosure.

One camera 14 of the two cameras 14 is arranged at a position where an eyeball image of the left eye may be acquired, so as to acquire the eyeball image of the left eye; and the other camera 14 is arranged at a position where an eyeball image of the right eye may be acquired, so as to acquire the eyeball image of the right eye. The two cameras 14 are connected to one or more (at least two) processors 16, so that the processor 16 may determine a fixation point position (e.g., fixation point coordinates) on the left-eye screen DL according to the eyeball image of the left eye when the left eye views the left-eye screen DL, and/or determine a fixation point position (e.g., fixation point coordinates) on the right-eye screen DR according to the eyeball image of the right eye when the right eye views the right-eye screen DR. For example, referring to FIG. 4A, the two cameras 14 are both connected to one or more processors 16, and thus it may be considered that they together constitute a main component of a digital camera C. For another example, referring to FIG. 4B, one camera 14 is connected to one or more processors 16 to constitute a main component of a digital camera C, and another camera 14 is connected to one or more processors 16 to constitute a main component of another digital camera C.

The memory 15 may store computer programs and data. The memory 15 may include a high-speed random access memory, and a non-volatile memory, such as a magnetic disk storage device, a flash memory device, or other volatile solid state storage devices.

The at least one processor 16 is connected to a plurality of parts of the VR device 1 through various interfaces and lines, and calls the data in the memory 15 by running or executing the computer programs stored in the memory 15, so that the VR device 1 realizes various functions thereof. The at least one processor 16 may be one or more central processing units (CPUs), microprocessors, application-specific integrated circuits (ASICs) or integrated circuits for controlling program execution of some embodiments of the present disclosure. The CPU may be a single-core CPU or a multi-core CPU. The processor 16 herein reference may be made to one or more devices, circuits or processing cores for processing data (e.g., computer program instructions). In addition, the at least one processor 16 may further include a graphics processor unit (GPU).

In some other embodiments, referring to FIG. 2, the VR device 1 may further include an audio device 17 and a microphone 18 that are connected to the processor 16, so as to improve user experience.

In the related art, a VR device usually only includes one camera corresponding to the left eye for acquiring the eyeball image of the left eye; or, the VR device only includes one camera corresponding to the right eye for acquiring the eyeball image of the right eye. However, the human eyes have a certain characteristic that one of the two eyes usually plays a dominant role to an extent and assumes the main responsibility of positioning and fusion. This eye is called a dominant eye. Many users belong to a category where one eye is the dominant eye and the other eye is a non-dominant eye. When these users use the VR device, the VR device may acquire the eyeball image of the non-dominant eye, and then render a subsequent image to be displayed accordingly. Such a rendering result cannot ensure a display effect such as the clarity of the image viewed by the dominant eye, thereby affecting an overall viewing experience of the user. For example, the VR device includes only one camera for collecting the eyeball image of the left eye. In a case where the dominant eye of the user is the right eye, the VR device renders the subsequent image to be displayed according to the eyeball image of the left eye (non-dominant eye). In this case, although the clarity of the rendered image may meet the needs of the non-dominant eye, it may not meet the needs of the dominant eye. Consequently, the image viewed by the dominant eye may still be blurred, and the final 3D image viewed by the user through both eyes is not clear, but blurry, which affects the viewing experience of the user.

However, in some embodiments of the present disclosure, the VR device 1 includes two cameras 14. In this case, according to dominant eye(s) (including the left eye and/or the right eye) of the user, camera(s) 14 corresponding to the dominant eye(s) may be turned on to acquire eyeball image(s) of the dominant eye(s), and then fixation point position(s) corresponding to the eyeball image(s) of the dominant eye(s) are determined; then, the obtained fixation point position(s) are sent to the terminal 2 through the communication device 13. The terminal 2 renders a left-eye image to be displayed and a right-eye image to be displayed according to the received fixation point position(s), and sends the rendered left-eye image and the rendered right-eye image to the VR device 1. The VR device 1 receives the rendered left-eye image and the rendered right-eye image through the communication device 13, and displays the rendered left-eye image on the rendered left-eye screen DL, and displays the rendered right-eye image on the rendered right-eye screen DR under the control of the processor 16. In the above process, no matter whether the dominant eye(s) of the user are the left eye, the right eye, or both eyes, the terminal 2 may render an image to be displayed adapted to the dominant eye(s), so that the image displayed by the VR device 1 always meets the clarity requirement of the dominant eye(s) of the user. That is, the image viewed by the dominant eye(s) of the user always has high clarity. As a result, the viewing experience of the user is improved.

Figure 5A:
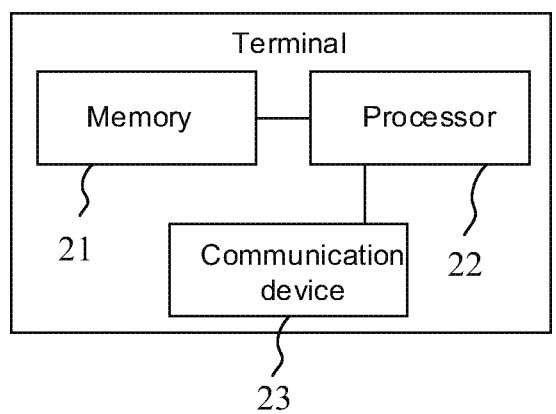
FIG. 5A is a structural diagram of a terminal, in accordance with some embodiments of the present disclosure.

Referring to FIG. 5A, the terminal 2 may include at least one memory 21, at least one processor 22 and a communication device 23.

The memory 21 may store a computer program and data. The memory 21 may include a high-speed random access memory, and a non-volatile memory, such as a magnetic disk storage device, a flash memory device, or other volatile solid state storage devices.

The at least one processor 22 is connected to a plurality of parts of the VR device 1 through various interfaces and lines, and calls the data in the memory 21 by running or executing the computer program stored in the memory 21, so that the VR device 1 realizes various functions thereof. The at least one processor 22 may be one or more CPUs, microprocessors, ASICs or integrated circuits for controlling program execution of some embodiments of the present disclosure. The CPU may be a single-core CPU or a multi-core CPU. The processor 22 herein reference may be made to one or more devices, circuits or processing cores for processing data (e.g. computer program instructions). In addition, the at least one processor 22 may further include a GPU.

The communication device 23 is a device that exchanges information with an external device (e.g., the VR device 1). The communication device 23 is connected to one or more (at least two) processors 22, so as to send data or a command to the external device or to receive data or a command sent by the external device under the control of the processor 22. The communication device 23 may be a transceiver, a transceiver circuit, a transmitter, a receiver, etc. For example, the communication device 3 may be a wireless communication device such as a Wi-Fi device or a Bluetooth device, or a wired communication device such as a USB interface. The Wi-Fi device provides the VR device 1 with a network access that complies with Wi-Fi related standard protocols. The Bluetooth device may be an integrated circuit or a Bluetooth chip.

Figure 5B:
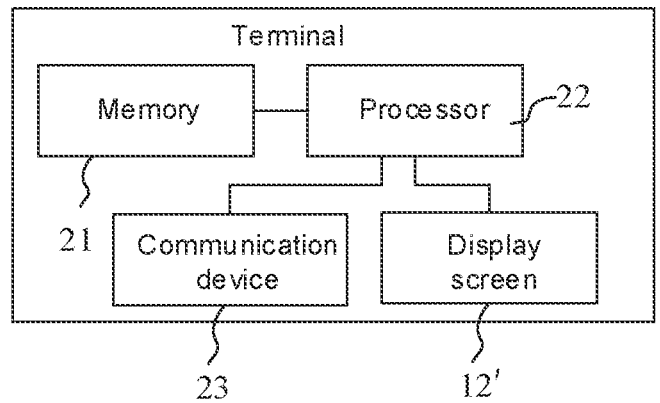
FIG. 5B is a structural diagram of another terminal, in accordance with some embodiments of the present disclosure.

In addition, in some other embodiments, referring to FIG. 5B, the terminal 2 may further include a display screen 12'. The terminal 2 may be a liquid crystal display screen, an OLED display screen, a QLED display screen, or any other screen having a display function. The display screen 12' may further have a touch function. In this case, the display screen 12' may be called a touch display screen, which facilitates the realization of human-computer interaction between the terminal 2 and the user.

Figure 5C:
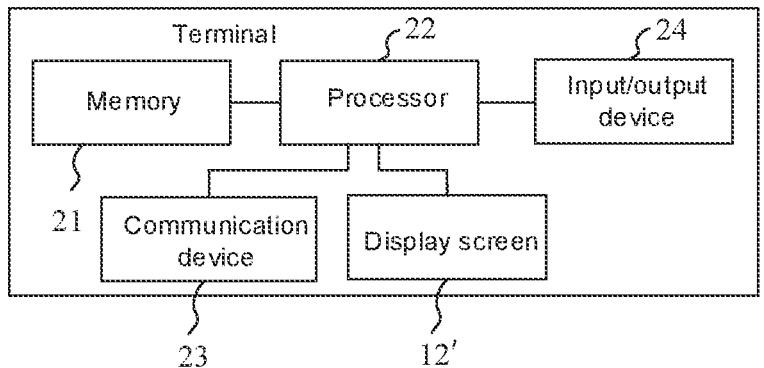
FIG. 5C is a structural diagram of yet another terminal, in accordance with some embodiments of the present disclosure.

Referring to FIG. 5C, the terminal 2 may further include an input/output device 24, such as a keyboard, a mouse, etc.

The terminal 2 may receive the fixation point position(s) of the dominant eye(s) (including left eye and/or right eye) sent by the VR device 1 through the communication device 23; the at least one processor 22 executes the computer program in the memory 21 to call the data (e.g., image data) in the memory, renders the left-eye image and the right-eye image with resolutions adapted to the dominant eye(s) according to the received fixation point position(s) of the dominant eye(s), and send the rendered images to the VR device 1 through the communication device 23, so that the VR device 1 displays the rendered images for the user to view.

In conjunction with the VR system described above, with reference to FIGS. 6A and 6B, some embodiments of the present disclosure provide an image processing method, which may include the following steps.

The dominant eye is one of the common traits lateral functional dominance of human beings. After the dominant eye of the user is determined, it may be possible to improve the users game experience, viewing experience and immersive interaction experience, etc. according to the characteristics of the dominant eye.

In some embodiments, steps 101 to 102 (S101 to S102) may be performed first, so that the user may know the dominant eye(s).

In S101, the terminal 2 sends a dominant eye test image to the VR device 1; accordingly, the VR device 1 receives the dominant eye test image sent by the terminal 2.

The dominant eye test image includes a left-eye test image and a right-eye test image that are different. When the user views the left-eye test image and the right-eye test image simultaneously through the VR device 1, the user may view the dominant eye test image with a depth of field, which is a result of combining the left-eye test image and the right-eye test image. The depth of field may be understood as a distance between the front and rear of objects (e.g., in the dominant eye test image) in a sharp image obtained by imaging of the front edge of the user's eyes.

Therefore, the terminal 2 needs to send both the left-eye test image and the right-eye test image to the VR device 1, and the VR device 1 may cache the dominant eye test image.

In S102, the VR device 1 displays the dominant eye test image on the left-eye screen DL and the right-eye screen DR respectively for the user to view.

The VR device 1 may display the cached left-eye test image on the left-eye screen DL, and display the cached right-eye image on the right-eye screen DR. The user may determine the dominant eye according to the left-eye test image displayed on the left-eye screen DL and the right-eye test image displayed on the right-eye screen DR.

Figure 7A:
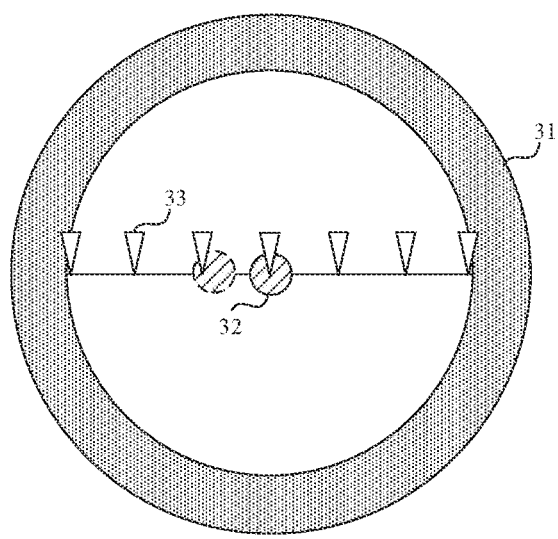
FIG. 7A is a front view of a dominant eye test image, in accordance with some embodiments of the present disclosure.
Figure 7B:
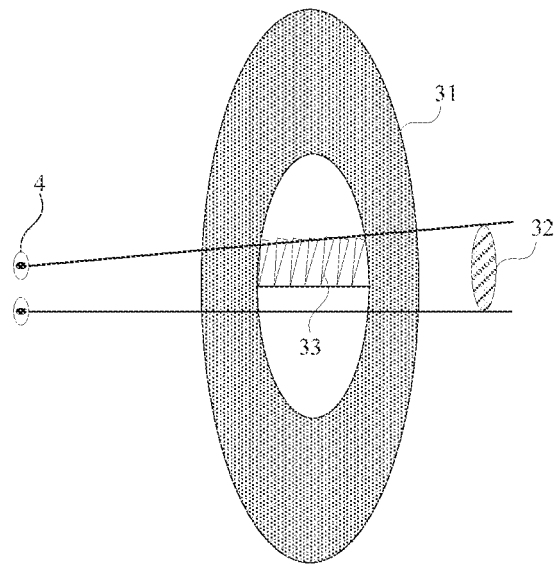
FIG. 7B is a side view of a dominant eye test image viewed by a user through a VR device, in accordance with some embodiments of the present disclosure.

For example, referring to FIG. 7A, the dominant eye test image 3 provided by the terminal 2 includes a ring 31, a ball 32 and positioning marks 33. That is, both the left-eye test image and the right-eye test image include a ring 31, a ball 32 and positioning marks 33, but a position of the ball 32 relative to a position of the ring 31 may be different in the left-eye test image and the right-eye test image. Referring to FIG. 7B, when the user's eyes 4 observe the dominant eye test image through the VR device 1, the ball 32 will have a certain depth of field relative to the ring 31.

A process for the user to determine the dominant eye by observing the dominant eye test image is as follows. First, the user observes a position of the ball 32 displayed on the left-eye screen DL and the right-eye screen DR of the VR device 1 through both eyes 4, and adjusts the position of the ball 32 through the terminal 2, until the position of the ball 32 is directly in front of the user's eyes 4. At this time, the ball 32 will coincide with a positioning mark 33 (the fourth positioning mark 33 from left to right as shown in FIG. 7A) located in the middle of the ring 31.

It will be noted that, in a display process of the left-eye screen DL and the right-eye screen DR, the terminal 2 will send a plurality of left-eye test images (the same or different) to the left-eye screen DL according to the refresh rate of the left-eye screen DL, and send a plurality of right-eye test images (the same or different) to the right-eye screen DR according to the refresh rate of the right-eye screen DR. Therefore, the terminal 2 may adjust the position of the ball 32, and then send a left-eye test image and/or a right-eye test image after the position of the ball 32 is adjusted to the VR device 1, until the ball 32 coincides with the positioning mark 33 located in the middle of the ring 31.

Second, the user closes the left eye and observes the position of the ball 32 with the right eye. If the position of the ball 32 is basically the same as the position of the ball 32 observed by both eyes 4 (that is, the ball 32 is in the middle of the ring 31, and coincides with or is close to the positioning mark 33 in the middle of the ring 31), it means that the right eye of the user is the dominant eye. If the ball 32 does not coincide with the positioning mark 33 in the middle of the ring 31 (that is, the ball 32 coincides with other positioning marks 33, for example, the ball 32 coincides with the second positioning mark 33 from left to right), it means that the right eye of the user is not the dominant eye.

Third, the user closes the right eye and observes the position of the ball 32 with the left eye. If the position of the ball 32 is basically the same as the position of the ball 32 observed by both eyes 4 (that is, the ball 32 is in the middle of the ring 31, and coincides with or is close to the positioning mark 33 in the middle of the ring 31), it means that the left eye of the user is the dominant eye; and if the ball 32 coincides with other positioning marks 33, it means that the left eye of the user is not the dominant eye.

It will be noted that when the user only uses the left eye to observe the left-eye test image or only uses the right eye to observe the right-eye test image, the observed left-eye test image and the observed right-eye image are the left-eye test image and the right-eye image that make the ball 32 coincide with the positioning mark 33 in the middle when the user uses both eyes to observe the test images.

If the position of the ball 32 when observed only by the right eye of the user and the position of the ball 32 when observed only by the right eye of the user are basically the same as the position of the ball 32 when observed by both eyes 4 (that is, the ball 32 is right in the middle of the ring 31, and coincides with or is close to the positioning mark 33 in the middle of the ring 31), it means that both eyes 4 of the user are the dominant eyes.

It will be noted that, since the user observes a positional relationship between the ball 32 and the positioning marks 33 during the test, it doesn't matter if there is a ring 31 in the dominant eye test image or not. In the present disclosure, the ring 31 serves as a reference to limit a region where the ball 32 is located, which helps the user to determine a relative position between the ball 32 and the positioning marks 33.

Therefore, in the above test, the test results include three situations: the right eye of the user is the dominant eye; the left eye of the user is the dominant eye; and both eyes 4 of the user are the dominant eyes. However, a situation that both eyes 4 of the user are not dominant eyes will not occur.

In some other embodiments, the user may find out which eye is the dominant eye by other means. For example, the user may get tested at a special testing organization, which informs him of the test result.

After the user finds out the dominant eye thereof, step 103 (S103) may be performed, so that the terminal 2 may determine the dominant eye of the user; alternatively, step 103' (S103') may be performed, so that the VR device 1 may determine the dominant eye of the user.

Figure 6A:
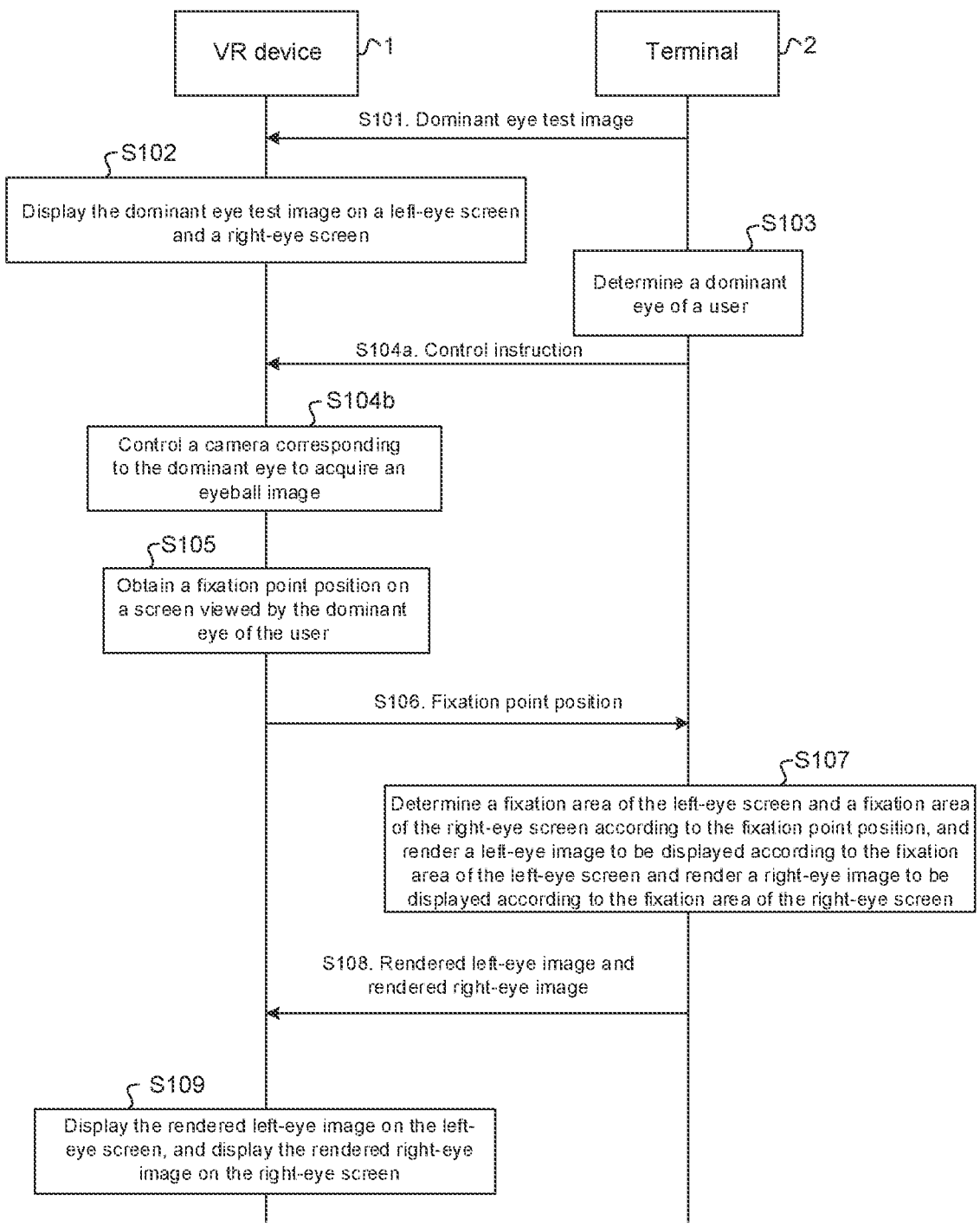
FIG. 6A is a flow diagram showing an interaction between a VR device and a terminal in an image processing method, in accordance with some embodiments of the present disclosure.

In S103, referring to FIG. 6A, the terminal 2 determines the dominant eye of the user. That is, the terminal 2 obtains dominant eye information of the user.

In some embodiments, the terminal 2 displays a human-computer interaction interface. According to prompts on the human-computer interaction interface, the user may input the dominant eye information to the terminal 2 through a touch-sensitive display screen 12' of the terminal 2, or the input/output device 24 of the terminal 2, so that the terminal 2 obtains the dominant eye information of the user. For example, the human-computer interaction interface displayed on the terminal 2 allows the user to select at least one of the left eye and the right eye as the dominant eye. Therefore, in this case, the dominant eye information is used to indicate that the left eye and/or right eye of the user is the dominant eye. If the left eye and right eye of the user are both dominant eyes, the user may select one of the two eyes as the dominant eye, or select both eyes as the dominant eyes. For another example, the human-computer interaction interface displayed on the terminal 2 only allows the user to select one of the left eye and the right eye as the dominant eye. In this case, the dominant eye information is used to indicate that the left eye or right eye of the user is the dominant eye. If the left eye and right eye of the user are both dominant eyes, the user may select one of the two eyes as the dominant eye, and input corresponding dominant eye information to the terminal 2.

In some other embodiments, other devices in communication with the terminal 2, such as the VR device 1, may send the dominant eye information to the terminal 2. Accordingly, the terminal 2 receives the dominant eye information, so that the terminal 2 may determine the dominant eye of the user. The VR device 1, with reference to S103', may also determine the dominant eye of the user.

Figure 6B:
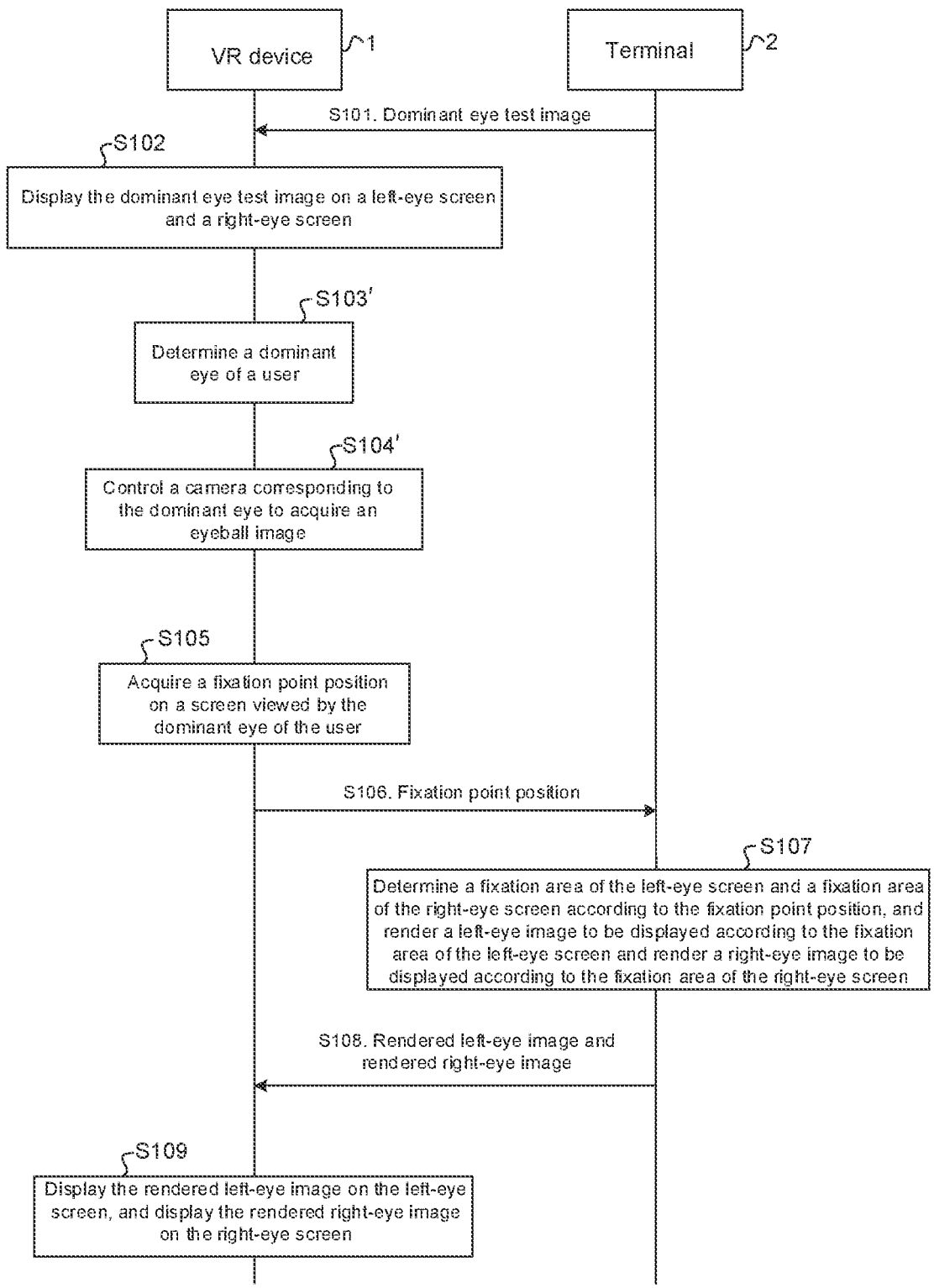
FIG. 6B is a flow diagram showing an interaction between a VR device and a terminal in another image processing method, in accordance with some embodiments of the present disclosure.

In S103', referring to FIG. 6B, the VR device 1 determines the dominant eye of the user. That is, the VR device 1 obtains the dominant eye information of the user.

For example, the VR device 1 may be provided with a switch, which is connected to the processor 16 in the VR device 1. A working state (a turn-on state or a turn-off state) of the switch may be set after the user finds out which eye is the dominant eye. The processor 16 in the VR device 1 may obtain the dominant eye information (indicating that the left eye or right eye of the user is the dominant eye) according to the working state of the switch, and send the dominant eye information to the terminal 2 through the communication device 13 in the VR device 1. For example, if the switch is in the turn-on state, it means that the left eye of the user is the dominant eye; if the switch is in the turn-off state, it means that the right eye of the user is the dominant eye. For another example, a 2-bit dip switch may be provided in the VR device 1, and the user may set the dip switch to allow the VR device 1 to obtain the dominant eye information (indicating that the left eye and/or right eye of the user is the dominant eye), so that the terminal 2 obtains the dominant eye information. In some embodiments, the VR device 1 may not send the dominant eye information of the user to the terminal 2 after determining the dominant eye of the user.

In addition, the dominant eye information in S103 or S103' may further include a level of the dominant eye. The level of the dominant eye is determined according to the test results of the user when the user views the dominant eye test image. A relationship between the level of the dominant eye and the ball 32 is shown in the following Table 1.

TABLE 1

| The ball coincides with an nth (n is a positive integer) positioning mark (from left to right). | Level of the dominant eye |
|---|---|
| 1 | 0.7 |
| 2 | 0.8 |
| 3 | 0.9 |
| 4 | 1.0 |
| 5 | 0.9 |
| 6 | 0.8 |
| 7 | 0.7 |

For example, referring to FIG. 7A, in the test results, if the ball 32 coincides with the third positioning mark 33 (from left to right or from right to left), the level of the dominant eye is set to 0.9. For another example, if the ball 32 is located between the third positioning mark 33 and the fourth positioning mark 33, the level of the dominant eye is set to a level of the dominant eye corresponding to a positioning mark 33 that is closer to the ball 32; if a distance between the ball 32 and the third positioning mark 33 is equal to a distance between the ball 32 and the fourth positioning mark 33, the level of the dominant eye may be set to a level of the dominant eye corresponding to the third positioning mark 33 or a level of the dominant eye corresponding to the fourth positioning mark 33.

Next, steps 104a to 104b (S104a to S104b) or step 104' (S104') may be performed, so that the VR device 1 may acquire an eyeball image of the dominant eye of the user.

In S104a, referring to FIG. 6A, the terminal 2 sends a control instruction to the VR device 1 according to the determined dominant eye of the user; accordingly, the VR device 1 receives the control instruction.

After the terminal 2 determines the dominant eye of the user in S103, the terminal 2 may send the control instruction to the VR device 1 through the communication device 23. The control instruction is used to control the VR device 1 to acquire the eyeball image of the dominant eye. For example, the control instruction may contain the dominant eye information.

In S104b, the VR device 1 acquires an eyeball image of the dominant eye of the user according to the control instruction.

After obtaining the control instruction through the communication device 13, the processor 16 in the VR device 1 may control camera(s) 14 corresponding to the dominant eye(s) to be turned on according to the dominant eye information, so as to acquire the eyeball image(s) of the dominant eye(s). For example, if the dominant eye information is used to indicate that the left eye or the right eye is the dominant eye, the VR device 1 only needs to turn on a camera 14 corresponding to the dominant eye information. If the dominant eye information is used to indicate that the left eye and/or the right eye is the dominant eye, in a case where the dominant eye information indicates that the left eye (or the right eye) is the dominant eye, the VR device 1 may turn on a camera 14 corresponding to the left eye (or the right eye); in a case where the dominant eye information indicates that both eyes are the dominant eyes, the VR device 1 may turn on only one of the cameras 14, or both of the cameras 14.

In S104', referring to FIG. 6B, the VR device 1 acquires the eyeball image of the dominant eye of the user according to the result determined in S103'.

For example, the switch or the 2-bit dip switch in the VR device 1 may be connected to the camera 14 corresponding to the dominant eye through the processor 16, and the processor 16 may control the camera 14 corresponding to the dominant eye to be in a turn-on state according to the obtained dominant eye information (as for a corresponding relationship between the dominant eye information and the turned-on camera 14, reference may be made to the description in S104b), so that the processor 16 may obtain the eyeball image of the dominant eye of the user through the turned-on camera 14.

In step 105 (S105), the VR device 1 obtains a fixation point position on a screen viewed by the dominant eye of the user.

Fixation refers to aligning the fovea of the eye with an object for more than a certain period of time, such as 100 milliseconds, during which the object being fixated is imaged on the fovea to be more adequately processed to form a sharp image. A fixation point refers to a certain point on an object that an eye aim at during a process of viewing the object, and the object here may be a screen.

The VR device 1 may use an eye tracking technology to acquire the eyeball image of the dominant eye of the user. Also known as eyeball tracking technology, the eye tracking technology is a technology that collects eyeball images of the human eye to analyze the movements of the eyeball, and then determines a fixation point on the screen currently viewed by the human eye based on the movements of the eyeball.

The camera 14 in the VR device 1 is, for example, a pupil camera. The pupil camera collects the eyeball image of the human eye by directing near-infrared light to the pupil of the eye to cause detectable reflected light in the pupil and the cornea. A vector is created between the detectable reflected light and the cornea and the pupil, which is tracked and photographed by the pupil camera. This is optical tracking of corneal reflection called pupil-corneal reflection (Pupil-CR). By continuously recording corneal reflection of the human eye, then using image processing technology, a complete image of eye movement is obtained. By using a data processing, it may be possible to achieve a purpose of tracking the line of sight, and thus determine a fixation point position of the human eye at a certain moment. In a case where only one camera 14 is turned on to obtain an eyeball image of one eye (the left eye or the right eye), a fixation point position of this eye, that is, a single fixation point position, may be obtained in this step. In a case where two cameras 14 are turned on to obtain the eyeball images of two eyes, the fixation point positions of two eyes, that is, two fixation point positions, may be obtained in this step.

The fixation point position may be fixation point coordinates. For example, referring to FIG. 8, a Cartesian coordinate system is established with an upper left corner of the left-eye screen DL or the right-eye screen DR as the origin, a row direction of pixels as an extension direction of x-axis, and a column direction of pixels as an extension direction of y-axis, so as to determine the fixation point coordinates (fixation point position 120') in the Cartesian coordinate system.

In step 106 (S106), the VR device 1 sends the fixation point position 120' to the terminal 2; accordingly, the terminal 2 receives the fixation point position 120'.

After obtaining the fixation point position 120', the processor 16 in the VR device 1 may send the fixation point position 120' to the terminal 2 through the communication device 13. Accordingly, the communication device 23 in the terminal 2 receives the fixation point position 120' sent by the VR device 1.

In step 107 (S107), the terminal 2 determines a fixation area of the left-eye screen DL and a fixation area of the right-eye screen DR according to the fixation point position 120', and renders a left-eye image to be displayed according to the fixation area of the left-eye screen DL and renders a right-eye image to be displayed according to the fixation area of the right-eye screen DR.

Determining, by the terminal 2, the fixation area 120 of the left-eye screen DL and the fixation area 120 of the right-eye screen DR according to the fixation point position 120' includes: determining, by the terminal 2, the fixation area 120 of the left-eye screen DL and the fixation area 120 of the right-eye screen DR according to one fixation point position 120', or, determining, by the terminal 2, the fixation area 120 of the left-eye screen DL and the fixation area 120 of the right-eye screen DR according to two fixation point positions 120', respectively.

In some embodiments, in the process that the terminal 2 determines the fixation area 120 of the left-eye screen DL and the fixation area 120 of the right-eye screen DR, although the terminal 2 may receive only one fixation point position 120', due to a corresponding relationship between the fixation point position 120' on the left-eye screen DL and the fixation point position 120' on the right-eye screen DR, the fixation areas 120 of two screens may be determined according to only one fixation point position 120'.

For example, the left-eye screen DL and the right-eye screen DR are of a same size (that is, the number of rows and the number of columns of pixels included in the left-eye screen DL and the right-eye screen DR are the same), and Cartesian coordinate systems are established with respective upper left corners as the origin. In this case, if the terminal 2 only receives fixation point coordinates (i, j) on the left-eye screen DL, the data of the fixation point coordinates (i, j) may also represent fixation point coordinates on the right-eye screen DR. Therefore, an area with a size of M1×N1 (i.e., M1 rows of pixels and N1 columns of pixels) with the fixation point coordinates (i, j) as the center on the left-eye screen DL may be determined as the fixation area 120 of the left-eye screen DL, and an area with a size of M2×N2 (i.e., M2 rows of pixels and N2 columns of pixels) with the fixation point coordinates (i, j) as the center on the right-eye screen DR may be determined as the fixation area 120 of the right-eye screen DR. M1 and M2 may or may not be equal; N1 and N2 may or may not be equal.

For another example, if M1 is equal to M2, and N1 is equal to N2, the data used to represent the fixation area 120 of the left-eye screen DL may also be used to represent the fixation area 120 of the right-eye screen DR. That is to say, the same data may represent both the fixation area 120 of the left-eye screen DL and the fixation area 120 of the right-eye screen DR. In this case, the terminal 2 may obtain data representing the fixation area 120 after obtaining the fixation point position 120' of the one dominant eye, and the terminal 2 may render both the left-eye image to be displayed and the right-eye image to be displayed according to the data representing the fixation area 120.

In some other embodiments, the terminal 2 obtains two fixation point positions 120', which means that both eyes of the user are dominant eyes. In this case, the terminal 2 may determine the fixation area of the left-eye screen DL according to the fixation point position 120' on the left-eye screen DL, and determine the fixation area 120 of the right-eye screen DR according to the fixation point position 120' on the right-eye screen DR. As for the relationship between the fixation point position 120' and the fixation area 120, reference may be made to the above embodiments.

In yet some other embodiments, the terminal 2 obtains two fixation point positions 120', which means that both eyes of the user are dominant eyes. In this case, the terminal 2 may determine the fixation area of the left-eye screen DL and the fixation area 120 of the right-eye screen DR according to any one of the two fixation point positions 120'. As for the relationship between the fixation point position 120' and the fixation area 120, reference may be made to the above embodiments.

It will be noted that, since the left eye and the right eye of a person are located at different positions in space, viewing angles of the two eyes are different. As a result, the same object in visual fields of different eyeballs will have different locations. Therefore, even if the left-eye screen DL and the right-eye screen DR are of the same size and Cartesian coordinate systems are established with respective upper left corners as the origin, the fixation point position 120' of the left eye and the fixation point position 120' of the right eye may in fact correspond to different coordinates when the user views images. However, in the embodiments of the present disclosure, since the fixation point position 120' of the dominant eye is used to determine the fixation area 120, the fixation point position 120' and the fixation area 120 must meet the needs of the dominant eye. Even if the coordinates representing the fixation point position 120' of the dominant eye may not be used to represent a fixation point position 120' of the non-dominant eye, since the non-dominant eye does not play a role as significant as that of the dominant eye in binocular viewing, and viewing angles of two eyes at fixation are generally not very different, it is feasible to infer the fixation point position 120' and a fixation area 120 of the non-dominant eye according to the fixation point position 120' and fixation area 120 of the dominant eye without affecting the visual clarity when the user views the image.

The determination of the fixation area 120 is for rendering the left-eye image and the right-eye image by region. For example, a first part of the left-eye image is a part of the left-eye image to be displayed in the fixation area 120 of the left-eye screen DL; and a second part of the left-eye image is a part of the left-eye image other than the first part, that is, a part of the left-eye image to be displayed in a non-fixation area of the left-eye screen DL. A first part of the right-eye image is a part of the right-eye image to be displayed in the fixation area 120 of the right-eye screen DR, and a second part of the right-eye image is a part of the right-eye image other than the first part, that is, a part of the right-eye image to be displayed in a non-fixation area of the right-eye screen DR. Then, different parts of the left-eye image and different parts of the right-eye image are rendered separately.

Rendering, by the terminal 2, the left-eye image and the right-eye image according to the fixation area 120 of the left-eye screen DL and the fixation area 120 of the right-eye screen DR includes: rendering, by the terminal 2, the first part of the left-eye image to be displayed on the left-eye screen DL at a first resolution, and rendering, by the terminal 2, the second part of the left-eye image at a second resolution, the first resolution being greater than the second resolution; and rendering, by the terminal 2, the first part of the right-eye image to be displayed on the right-eye screen DR at a third resolution, and rendering, by the terminal 2, the second part of the right-eye image at a fourth resolution, the third resolution being greater than the fourth resolution. Therefore, the first part of the rendered left-eye image is of a high resolution, and the second part of the rendered left-eye image is of a low resolution; and the first part of the rendered right-eye image is of a high resolution, and the second part of the rendered right-eye image is of a low resolution.

A resolution of an image to be displayed in the fixation area 120 of the screen viewed by the dominant eye of the user is greater than or equal to resolutions of images to be displayed in other areas of the left-eye screen DL and the right-eye screen DR.

For example, if the terminal 2 obtains the fixation point position 120' of the left eye, it means that the left eye of the user is the dominant eye. In this case, after the left-eye image and the right-eye image are rendered, the resolution of the first part of the rendered left-eye image is greater than or equal to the resolution of the first part of the rendered right-eye image, and the resolution of the first part of the rendered left-eye image is greater than the resolution of the second part of the rendered left-eye image, and greater than the resolution of the second part of the rendered right-eye image.

For example, if the terminal 2 obtains the fixation point position 120' of the right eye, it means that the right eye of the user is the dominant eye. In this case, after the left-eye image and the right-eye image are rendered, the resolution of the first part of the rendered right-eye image is greater than or equal to the resolution of the first part of the rendered left-eye image, and the resolution of the first part of the rendered right-eye image is greater than the resolution of the second part of the rendered right-eye image, and greater than the resolution of the second part of the rendered left-eye image.

For another example, if the terminal 2 obtains the fixation point position 120' of the left eye and the fixation point position 120' of the right eye, it means that both the left eye and the right eye of the user are the dominant eyes. In this case, after the left-eye image and the right-eye image are rendered, the resolution of the first part of the rendered left-eye image is greater than the resolution of the second part of the rendered left-eye image and greater than the resolution of the second part of the rendered right-eye image, and the resolution of the first part of the rendered right-eye image is greater than the resolution of the second part of the rendered right-eye image and greater than the resolution of the second part of the rendered left-eye image. The resolution of the first part of the rendered left-eye image may or may not be equal to the resolution of the first part of the rendered right-eye image.

In some embodiments, the dominant eye is the left eye of the user. That is, the terminal 2 obtains the fixation point position 120' of the left eye. In this case, the third resolution is greater than the second resolution and less than the first resolution, and/or, the fourth resolution is less than the second resolution.

The left eye of the user is the dominant eye, and the right eye thereof is the non-dominant eye. In this case, the relationship between the resolutions (the first resolution to the fourth resolution) includes the following situations.

The third resolution is greater than the second resolution and less than the first resolution, and the fourth resolution is less than the second resolution.

The resolution of the first part of the right-eye image and the resolution of the second part of the right-eye image are respectively less than the resolution of the first part of the left-eye image and the resolution of the second part of the left-eye image. In this case, it may be possible to reduce the rendering pressure of the terminal 2 in rendering the right-eye image to be displayed to the greatest extent.

The third resolution is greater than the second resolution and less than the first resolution, and the fourth resolution is equal to the second resolution. Since the third resolution is less than the first resolution, it may also be possible to reduce the rendering pressure of the terminal 2 in rendering the right-eye image to be displayed.

The third resolution is equal to the first resolution, and the fourth resolution is less than the second resolution. Since the fourth resolution is less than the second resolution, it may also be possible to reduce the rendering pressure of the terminal 2 in rendering the right-eye image to be displayed.

In a case where the left eye of the user is the dominant eye and the right eye thereof is the non-dominant eye, the third resolution and the fourth resolution of the right-eye image are set to reasonable values, so that the clarity of the left-eye image viewed by the left eye is higher than the clarity of the right-eye image viewed by the right eye. After the terminal 2 renders the left-eye image and the right-eye image according to the above resolutions, in one aspect, the clarity of the images viewed by both eyes may be guaranteed; in another aspect, since the resolution of the image corresponding to the non-dominant eye is reduced, it may be possible to reduce the rendering pressure of the terminal 2, reduce a memory space occupied by the image corresponding to the non-dominant eye, reduce a transmission bandwidth of transmitting the left-eye image and the right-eye image, and thereby increase the refresh rate of the terminal 2.

In some other embodiments, the dominant eye is the right eye of the user. That is, the terminal 2 obtains the fixation point position 120' of the right eye. In this case, the first resolution is greater than the fourth resolution and less than the third resolution, and/or, the second resolution is less than the fourth resolution.

The user's right eye is the dominant eye, and the left eye is the non-dominant eye. In this case, the relationship between the resolutions (the first resolution to the fourth resolution) includes the following situations.

The first resolution is greater than the fourth resolution and less than the third resolution, and the second resolution is less than the fourth resolution.

The first resolution is greater than the fourth resolution and less than the third resolution, and the second resolution is equal to the fourth resolution.

The first resolution is equal to the third resolution, and the second resolution is less than the fourth resolution.

The process and beneficial effects of a case where the user's right eye is the dominant eye and the left eye is the non-dominant eye are similar or the same as that of a case where the user's left eye is the dominant eye and the right eye is the non-dominant eye, and thus details will not be repeated here. In some embodiments, the dominant eyes are the left eye and the right eye of the user (i.e., the terminal 2 obtains both the fixation point position 120 of the left eye and the fixation point position 120' of the right eye); that is, both eyes of the user are dominant eyes. In this case, the third resolution is equal to the first resolution, and the fourth resolution is equal to the second resolution. That is to say, the terminal 2 renders the first part of the left-eye image and the first part of the right-eye image at a same resolution, and renders the second part of the left-eye image and the second part of the right-eye image at a same resolution, thereby ensuring the clarity of the image when the user views the image with both eyes.

It will be noted that, a case where a person with normal vision does not have a dominant eye will not appear.

As for a technology the terminal 2 uses to render the fixation area 120, for example, the Multi-Res Shading (MRS) technology and the Lens Matched Shading (LMS) technology provided by Nvidia may be adopted, so as to obtain a rendered image with varying clarity. In the rendered image with varying clarity, the clarity of a part of the rendered image located in the fixation area 120 is higher than the clarity of another part of the rendered image located in the non-fixation area, and the image sharpness of the fixation area 120 is fine if the fixation area 120 is a high-clarity area; the clarity of the part of the image in the non-gazing area is lower than the clarity of the part of the image in the fixation area 120, so that the image sharpness of the non-fixation area is reduced relative to the fixation area 120. However, since the human eyes generally focus on the fixation area 120, even if the image sharpness of the non-fixation area is low, it will not affect the ultimate clarity of the image when it is viewed by the human eyes. Therefore, in one aspect, the rendered image conforms to the way the human eyes focus and conforms to the observation habits of the human eyes; in another aspect, rendering the part of the image in the non-fixation area at a low resolution may reduce the rendering pressure of the terminal 2.

It will be noted that the first resolution, the second resolution, the third resolution and the fourth resolution correspond to the clarity of the image. The higher the resolution, the higher the clarity of the image and the sharper the image.

It will be noted that, no matter whether the terminal 2 renders the left-eye image first or renders the right-eye image first, or renders the left-eye image and the right-eye image at the same e, it does not affect the implementation of the image processing method.

In some embodiments, resolutions of a first part and a second part of an image corresponding to the non-dominant eye may be reduced according to the level of the dominant eye.

Referring to Table 1, for example, if the level of the dominant eye is 0.9, the resolution of the image to be displayed corresponding to the non-dominant eye may be reduced to 0.9 times the resolution of the image to be displayed corresponding to the dominant eye; if the level of the dominant eye is 0.8, the resolution of the image to be displayed corresponding to the non-dominant eye may be reduced to 0.8 times the resolution of the image to be displayed corresponding to the dominant eye, and so forth. As the level of the dominant eye changes, the resolution of the image to be displayed corresponding to the non-dominant eye may be reduced to 0.7 times, 0.6 times, etc. of the resolution of the image to be displayed corresponding to the dominant eye.

In some embodiments, if the dominant eye is the left eye of the user, then the first resolution is reduced according to the level of the dominant eye to obtain the third resolution; and/or, the second resolution is reduced according to the level of the dominant eye to obtain the fourth resolution.

For example, if the left eye is the dominant eye, the right eye is the non-dominant eye, and the level of the dominant eye is 0.9 then the third resolution is equal to 0.9 times the first resolution, and/or the fourth resolution is equal to 0.9 times the second resolution.

In some other embodiments, if the dominant eye is the right eye of the user, then the third resolution is reduced according to the level of the dominant eye to obtain the first resolution; and/or, the fourth resolution is reduced according to the level of the dominant eye to obtain the second resolution.

For example, if the right eye is the dominant eye, the left eye is the non-dominant eye, and the level of the dominant eye is 0.8 then the first resolution is equal to 0.8 times the third resolution, and/or the second resolution is equal to 0.8 times the fourth resolution.

By reducing the resolution at which the image to be displayed corresponding to the non-dominant eye is rendered according to the level of the dominant eye, it may be possible to further reduce the rendering pressure of the terminal 2 and the transmission bandwidth of the terminal 2 in transmitting the rendered left-eye image and the rendered right-eye image to the VR device 1.

In step 108 (S108), the terminal 2 sends the rendered left-eye image and the rendered right-eye image to the VR device 1; accordingly, the VR device 1 receives the rendered left-eye image and the rendered right-eye image.

The rendered left-eye image and the rendered right-eye image here will be understood as the left-eye image after rendering and the right-eye image after rendering.

In step 109 (S109), the left-eye screen DL of the VR device 1 displays the rendered left-eye image, and the right-eye screen DR of the VR device 1 displays the rendered right-eye image.

The resolution of the first part of the rendered left-eye image is the first resolution, the resolution of the second part of the rendered left-eye image is the second resolution, and the first resolution is greater than the second resolution. Therefore, the clarity of the first part of the rendered left-eye image is higher than the clarity of the second part of the rendered left-eye image, and the first part of the rendered left-eye image appears sharper. The resolution of the first part of the rendered right-eye image is the third resolution, the resolution of the second part of the rendered right-eye image is the fourth resolution, and the third resolution is greater than the fourth resolution. Therefore, the clarity of the first part of the rendered right-eye image is higher than the clarity of the second part of the rendered right-eye image, and the first part of the rendered right-eye image appears sharper. When the user views the image, the left eye mainly focuses on the first part of the rendered left-eye image, and the right eye mainly focuses on the first part of the rendered right-eye image. Since the resolution of the first part of the rendered left-eye image and the resolution of the first part of the rendered right-eye image are both high, the visual clarity of the image viewed by both eyes is also high.

Figure 9:
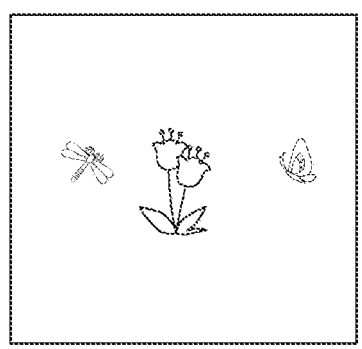
FIG. 9 is a diagram showing an effect of a user viewing rendered images displayed on a left-eye screen and a right-eye screen with both eyes, in accordance with some embodiments of the present disclosure.

When the images displayed by the left-eye screen DL and the right-eye screen DR of the VR device 1 are as shown in FIG. 3A and FIG. 3B the image displayed by the VR device 1 viewed by both eyes of the user is, for example, as shown in FIG. 9.

In the embodiments of the present disclosure, since the image is rendered according to the fixation point position 120' of the dominant eye, it may be possible to guarantee the visual clarity of the dominant eye, and ensure that the visual clarity of the both eyes of the user will not be reduced. As such, a good viewing effect of the image may be ensured, the user experience may be improved, and the adaptability of the image processing method to different users may be improved.

Figure 10:
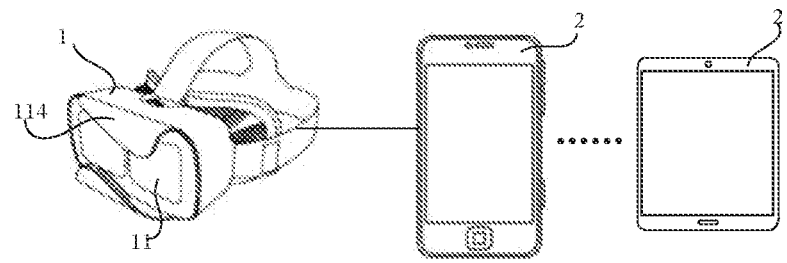
FIG. 10 is a structural diagram of another VR system, in accordance with some embodiments of the present disclosure.

Some embodiments of the present disclosure further provide a VR system. As shown in FIG. 10, the VR system includes: a VR device 1 and a terminal 2, which may be connected by wired communication or wireless communication. The VR device 1 may be a wearable VR device, for example, a VR HMD, a VR helmet, VR glasses, etc. The terminal 2 may be a computer, a notebook computer, a FDA, a mobile phone, etc.

Figure 11:
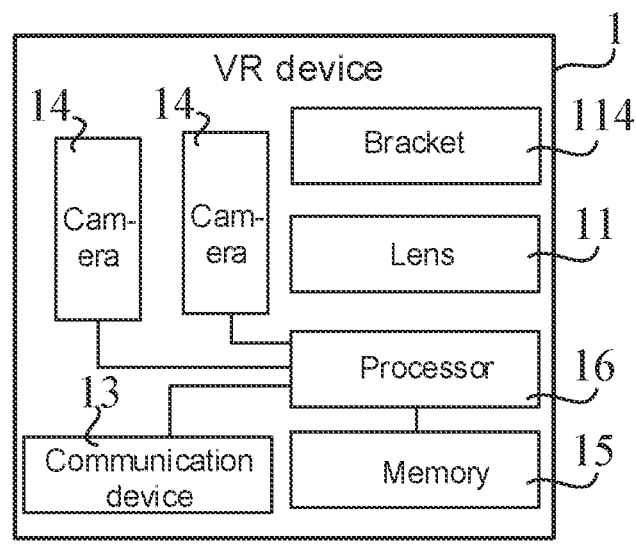
FIG. 11 is a structural diagram of another VR device, in accordance with some embodiments of the present disclosure.

Referring to FIG. 11, the VR device 1 may include a lens 11, at least one communication device 13, two cameras 14, at least one memory 15, at least one processor 16 and a bracket 114. The bracket 114 and the VR device 1 are, for example, of a one-piece structure, with the bracket 114 used for supporting the terminal 2.

Referring to FIG. 5B, the terminal 2 may include at least one memory 21, at least one processor 22, a communication device 23 and a display screen 12'. A left-eye screen DL and a right-eye screen DR may be two parts of the display screen 12' that do not overlap.

Referring to FIG. 5C, the terminal 2 may further include an input/output device 24, such as a keyboard or a mouse.

In a case where the terminal 2 is a smartphone or a PDA, the terminal 2 may also be mounted on the bracket 114 of the VR device 1.

As for description of some components of the VR system, reference may be made to the description of these components above.

In conjunction with the VR system described above, with reference to FIGS. 12A and 12B, some embodiments of the present disclosure provide an image processing method, which includes the following steps.

In some embodiments, step 201 (S201) may be performed first, so that the user may learn the dominant eye thereof.

In S201, the terminal 2 displays a dominant eye test image.

The terminal 2 displays the dominant eye test image on its display screen 12', and the user views the dominant eye test image displayed on the terminal 2 through VR glasses, so that the user may determine his dominant eye. As for a process by which the user determines the dominant eye, reference may be made to S102, and details will not be repeated here.

In some other embodiments, the user himself may find out which eye is the dominant eye thereof by other means. For example, the user may get tested at a special testing organization, which informs the user of the test result.

After the user finds out the dominant eye thereof, step 202 (S202) may be performed, so that the terminal 2 may determines the dominant eye of the user; alternatively, step 202' (S202') may be performed, so that the VR device 1 may determines the dominant eye of the user.

Figure 12A:
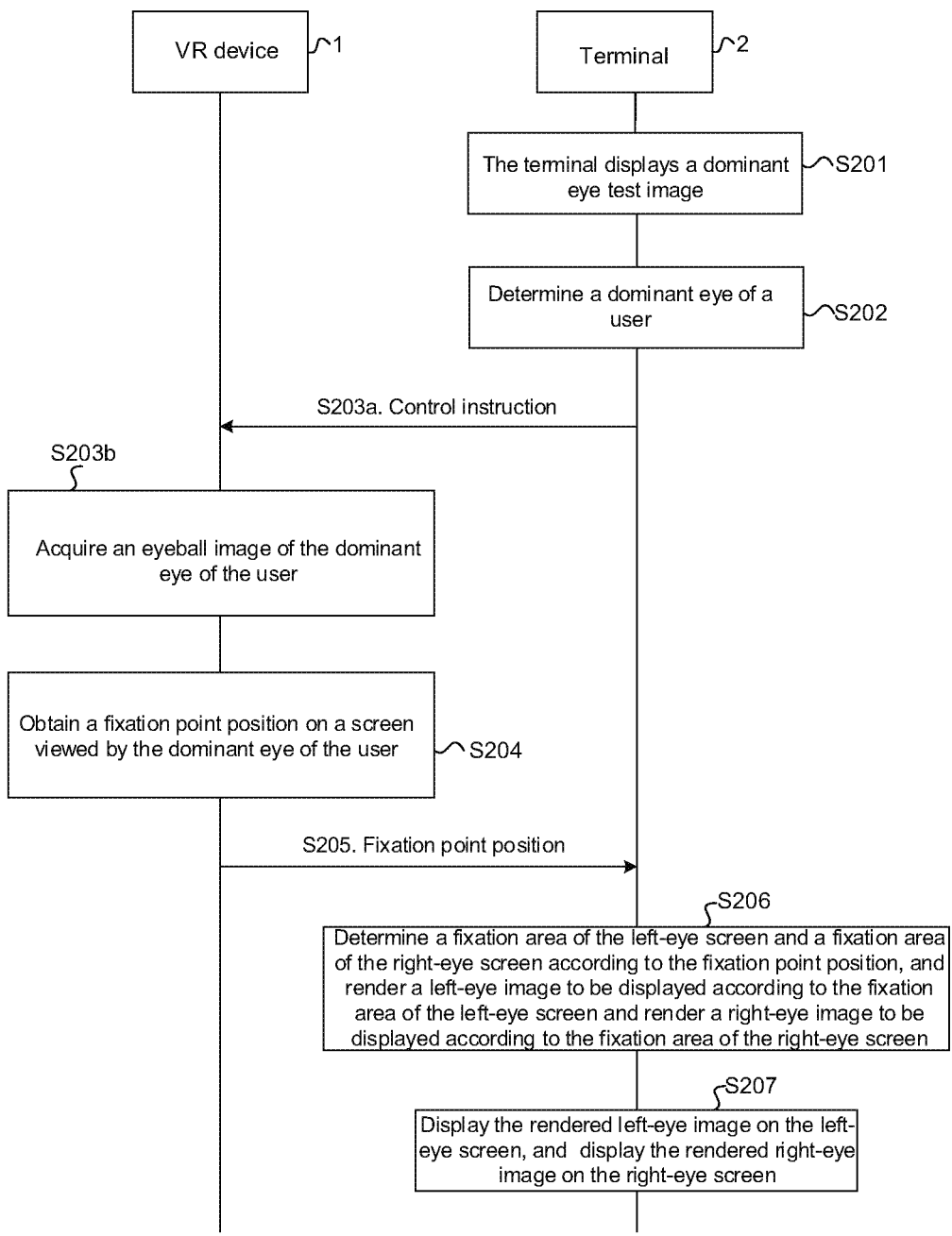
FIG. 12A is a flow diagram showing an interaction between a VR device and a terminal in yet another image processing method, in accordance with some embodiments of the present disclosure.

In S202, referring to FIG. 12A, the terminal 2 determines the dominant eye of the user. That is, the terminal 2 obtains the dominant eye information of the user.

In some embodiments, the terminal 2 displays a human-computer interaction interface. According to prompts on the human-computer interaction interface, the user may input the dominant eye information to the terminal 2 through a touch-sensitive display screen 12' of the terminal 2, or the input/output device 24 of the terminal 2, so that the terminal 2 obtains the dominant eye information of the user. As for this process, reference may be made to S103, and details will not be repeated here.

Figure 12B:
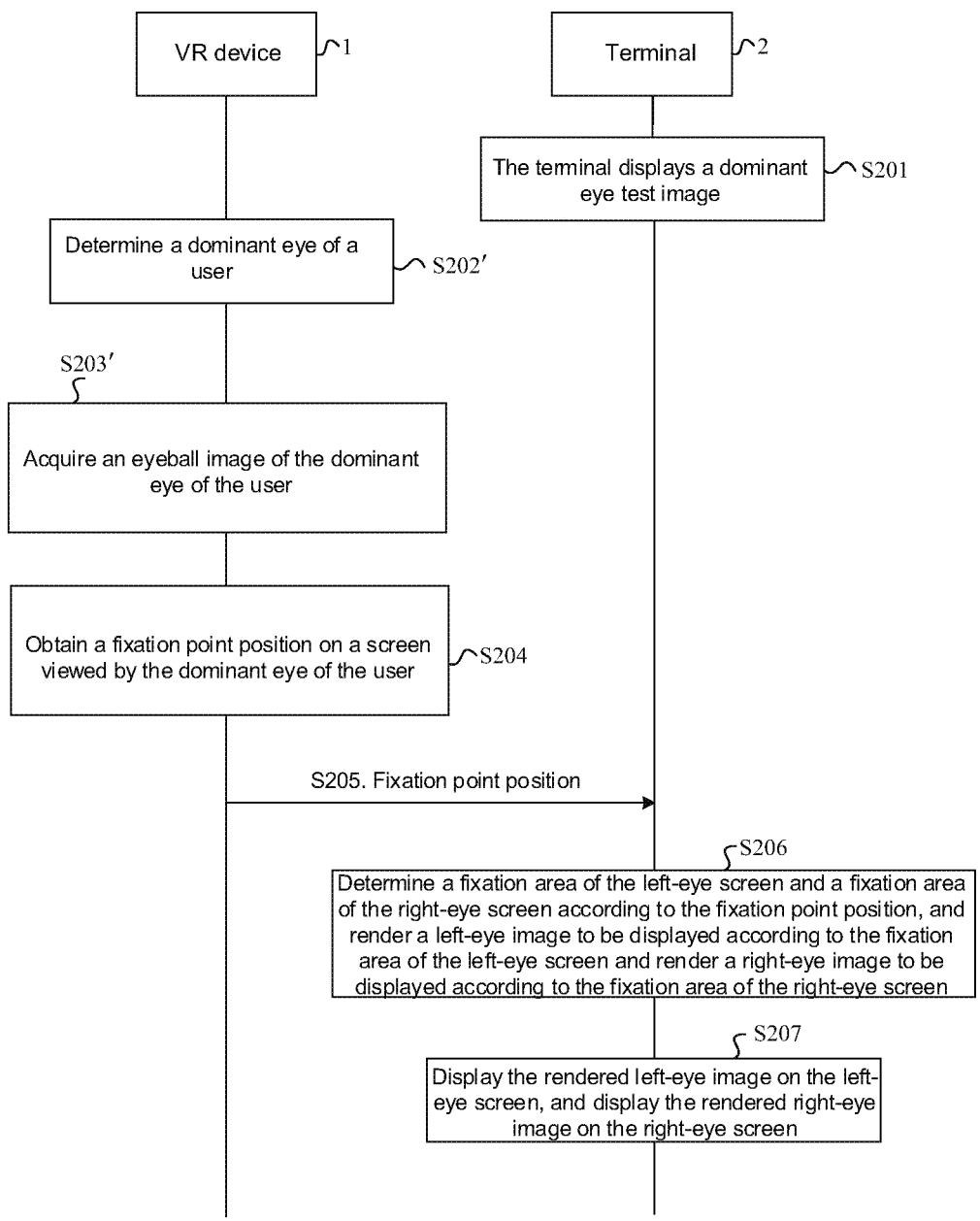
FIG. 12B is a flow diagram showing an interaction between a VR device and a terminal in yet another image processing method, in accordance with some embodiments of the present disclosure.

In S202', referring to FIG. 12B, the VR device 1 determines the dominant eye of the user. That is, the VR device 1 acquires the dominant eye information of the user. The process of acquiring the dominant eye information of the user by the VR device 1 is same as that described in S103', and details will not be repeated here.

In addition, the dominant eye information in S202 and S202' may further include a level of the dominant eye.

Next, steps 203a to 203b (S203a to S203b) or step 203' (S203') may be performed, so that the VR device 1 may acquire an eyeball image of the dominant eye of the user.

In S203a, referring to FIG. 12A, the terminal 2 sends a control instruction to the VR device 1 according to the determined dominant eye of the user; accordingly, the VR device 1 receives the control instruction.

The terminal 2 may send the control instruction to the VR device 1 through the communication device 23, and the control instruction is used to control the VR device 1 to acquire the eyeball image of the dominant eye. For example, the control instruction may contain the dominant eye information.

In S203b, the VR device 1 acquires the eyeball image of the dominant eye of the user according to the control instruction. This process is the same as that described in S104b, and details will not be repeated here.

In S203', referring to FIG. 12B, the VR device 1 acquires the eyeball image of the dominant eye of the user according to the result determined in S202'.

The process of acquiring the eyeball image of the dominant eye of the user by the VR device 1 is the same as that described in S104', and details will not be repeated here.

In step 204 (S204), the VR device 1 obtains a fixation point position 120' on the screen viewed by the dominant eye of the user. The process is the same as that described in S105, and details will not be repeated here.

The process of obtaining the fixation point position 120' by the VR device 1 is the same as the description above, and details will not be repeated here.

In step 205 (S205), the VR device 1 sends the fixation point position 120' to the terminal 2; accordingly, the terminal 2 receives the fixation point position 120'. The process by which the VR device 1 sends the fixation point position 120' to the terminal 2 is the same as the process in S106, and details will be repeated here.

In step 206 (S206), the terminal 2 determines a fixation area 120 of the left-eye screen DL and a fixation area 120 of the right-eye screen DR according to the fixation point position 120', and renders a left-eye image to be displayed according to the fixation area 120 of the left-eye screen DL and renders a right-eye image to be displayed according to the fixation area 120 of the right-eye screen DR.

The process by which the terminal 2 renders the left-eye image to be displayed and the right-eye image to be displayed is the same as that in S107, and details will not be repeated here.

In step 207 (S207), the left-eye screen DL of the VR device 1 displays the rendered left-eye image, and the right-eye screen DR of the VR device 1 displays the rendered right-eye image.

As for a process by which the terminal 2 displays the rendered left-eye image and the rendered right-eye image, reference may be made to the process by which the VR device 1 displays the rendered left-eye image and the rendered right-eye image, that is, S109.

When the images displayed by the left-eye screen DL and the right-eye screen DR of the terminal 2 are as shown in FIGS. 3A and 3B, the image displayed by the VR device 1 viewed by both eyes of the user is, for example, as shown in FIG. 9.

It may be possible to reduce production cost of the VR device 1 by installing the terminal 2 on the VR device 1 and using the display screen 12' on the terminal 2 to display images. In the meantime, in the VR system described above, the terminal 2 renders the image according to the fixation point position 120' of the dominant eye, which may guarantee the visual clarity of the dominant eye. Therefore, by using the image processing method provided in the present disclosure to process images, it may be possible guarantee the clarity of the image viewed by the dominant eye and ensure that the visual clarity of both eyes of the user will not be reduced. As such, a good viewing effect of the image may be ensured, the user experience may be improved, and the adaptability of the image processing method to different users may be improved.

The embodiments of the present disclosure further provides a display system, which includes a lens 11, a display device 12, at least one communication device 13, two cameras 14, at least one memory 15 and at least one processor 16. Referring to FIG. 2, the display system may be, for example, the VR device 1. In some embodiments, referring to FIG. 2, the VR device 1 further includes an audio device 17 and a microphone 18.

In combination with the display system described above, an image processing method of the display system will be described below by taking an example where the display system is the VR device.

Figure 13:
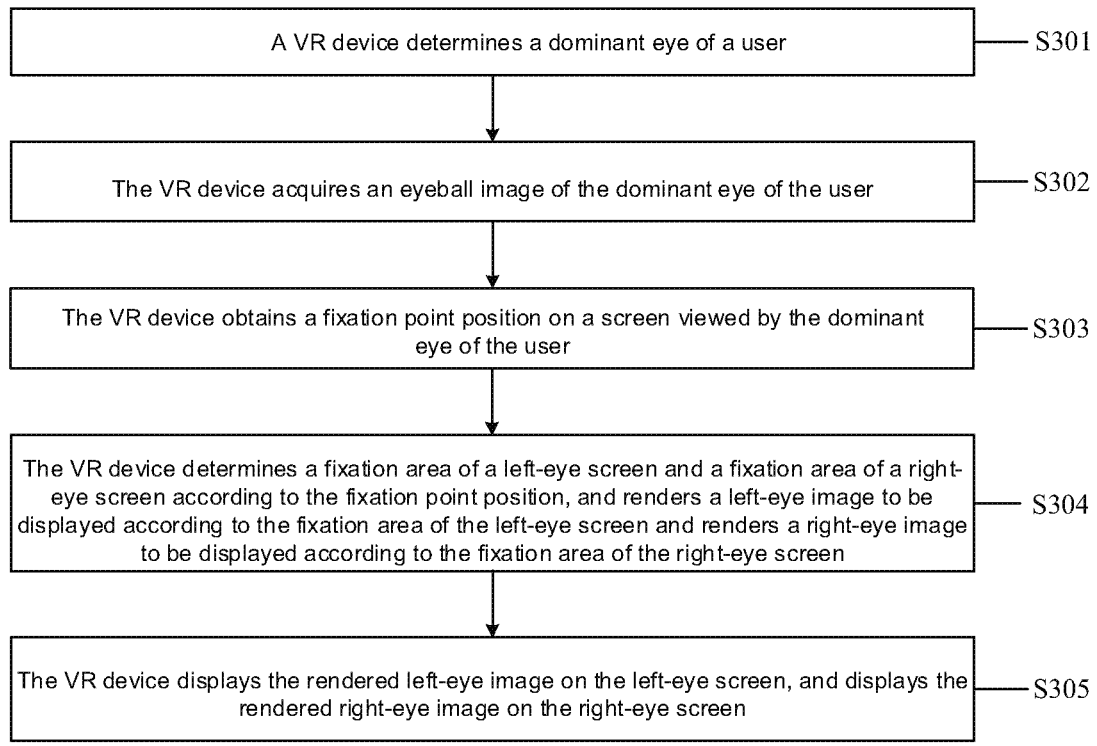
FIG. 13 is a flow diagram of an image processing method, in accordance with some embodiments of the present disclosure.

Referring to FIG. 13, some embodiments of the present disclosure further provide an image processing method, which may include the following steps 301 to 305 (S301 to S305).

In step 301, the VR device 1 determines the dominant eye of the user.

Before the VR device 1 determines the dominant eye of the user, the user needs to determine his dominant eye first. The process by which the user determines the dominant eye thereof includes, for example, the following situations.

In some embodiments, the VR device 1 displays a dominant eye test image on a left-eye screen DL and a right-eye screen DR in the display device 12 for the user to view, so that the user may determine the dominant eye thereof. The process by which the user determines the dominant eye thereof according to the dominant eye test image is the same as that of S102, and details will not be repeated here.

In some other embodiments, the user may find out which eye is the dominant eye thereof by other means. For example, the user may get tested at a special testing organization, which informs the user of the test result.

After the user determines the dominant eye thereof, the VR device 1 needs to determine the dominant eye of the user. For example, the user may input dominant eye information into the VR device 1 through a human-computer interaction interface on the display device 12. As for the human-computer interaction process between the user and the VR device 1, reference may be made to S103, and details will not be repeated here.

In some other embodiments, as for the process by which the VR device 1 determines the dominant eye of the user, reference may be made to S103'.

In S302, the VR device 1 acquires an eyeball image of the dominant eye of the user.

As for the process by which the VR device 1 acquires the eyeball image, reference may be made to the description in S104b or S104', and details will not be repeated here.

In S303, the VR device 1 obtains a fixation point position 120' on the screen viewed by the dominant eye of the user.

The process by which the VR device 1 calculates the fixation point position 120' on the screen viewed by the dominant eye of the user according to the eyeball image is the same as that of S105, and details will not be repeated here.

In S304, the VR device 1 determines a fixation area 120 of the left-eye screen DL and a fixation area 120 of the right-eye screen DR according to the fixation point position 120', and renders a left-eye image to be displayed according to the fixation area 120 of the left-eye screen DL and renders a right-eye image to be displayed according to the fixation area 120 of the right-eye screen DR.

Rendering, by the VR device 1, the left-eye image to be displayed according to the fixation area 120 of the left-eye screen DL, and rendering, by the VR device 1, the right-eye image to be displayed according to the fixation area 120 of the right-eye screen DR includes: rendering, by the VR device 1, a first part of the left-eye image to be displayed on the left-eye screen DL at a first resolution, and rendering, by the VR device, a second part of the left-eye image at a second resolution, the first part of the left-eye image being a part of the left-eye image to be displayed in the fixation area 120 of the left-eye screen DL, the second part of the left-eye image being a part of the left-eye image other than the first part, and the first resolution being greater than the second resolution; and rendering, by the VR device 1, a first part of the right-eye image to be displayed on the right-eye screen DR at a third resolution, and rendering, by the VR device 1, a second part of the right-eye image at a fourth resolution, the first part of the right-eye image being a part of the right-eye image to be displayed in the fixation area 120 of the right-eye screen DR, the second part of the right-eye image being a part of the right-eye image other than the first part, and the third resolution being greater than the fourth resolution.

As for the process by which the VR device 1 renders the left-eye image to be displayed and the right-eye image to be displayed, reference may be made to the process by which the terminal 2 renders the left-eye image to be displayed and the right-eye image to be displayed in S107.

In S305, the VR device 1 displays the rendered left-eye image on the left-eye screen DL., and displays the rendered right-eye image on the right-eye screen DR. This process is the same as that of S109, and details will not be repeated here.

The above VR device 1 may not only be able to determine the dominant eye of the user, but may also be able to render the left-eye image to be displayed and the right-eye image to be displayed, and display the rendered left-eye image and the rendered right-eye image. Therefore, the VR device 1 is highly integrated, small in size and portable.

Figure 8:
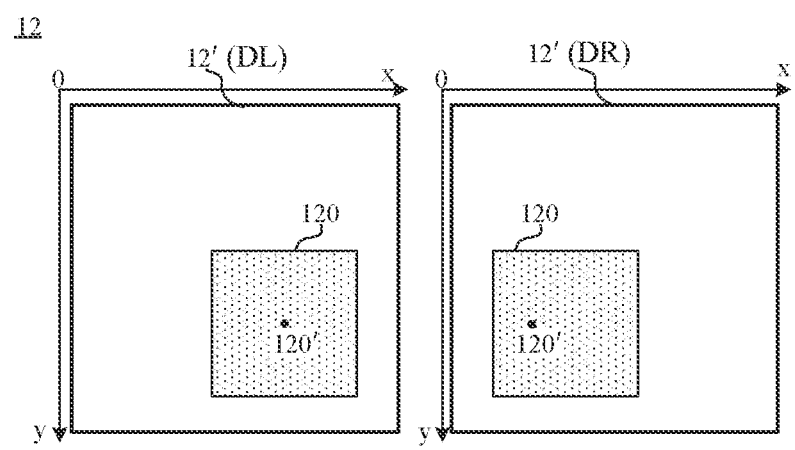
FIG. 8 is a front view of a fixation point area, in accordance with some embodiments of the present disclosure.

Referring to FIG. 2, the embodiments of the present disclosure further provide a VR device 1, which includes two cameras 14 and at least one processor 16. The two cameras 14 are in one-to-one correspondence with the left eye and the right eye of the user, and are configured to acquire eyeball images of eyes corresponding to the cameras 14. The at least one processor 16 is configured to control camera(s) 14 corresponding to dominant eye(s) of the user to work, and calculate fixation point position(s) 120' (e.g., as shown in FIG. 8) on screen(s) viewed by the dominant eye(s) according to eyeball image(s) acquired by the camera(s) 14. The dominant eye(s) include at least one of the left eye and the right eye of the user.

The VR device 1 includes two cameras 14, which may ensure that the eyeball image(s) of the dominant eye(s) of the user are acquired.

In some embodiments, referring to FIG. 2, the VR device 1 further includes a communication device 13, which is configured to send the fixation point position(s) 120' to the terminal 2 (e.g., as shown in FIG. 5A). Referring to FIG. 8, the fixation point position(s) 120' are used to determine a fixation area 120 of a left-eye screen DL and a fixation area 120 of a right-eye screen DR.

In some embodiments, in addition to sending the fixation point position(s) 120' to the terminal 2, the communication device 13 may also be able to send the fixation area 120 of the left-eye screen DL and the fixation area 120 of the right-eye screen DR to the terminal 2.

The communication device 13 is used to realize communication between the VR device 1 and the terminal 2, and the terminal 2 may undertake the work of rendering images (including the left-eye image to be displayed and the right-eye image to be displayed), so that the production cost of the VR device 1 may be reduced.

In some embodiments, referring to FIG. 2, the VR device 1 further includes a display device 12, and the display device 12 includes the left-eye screen DL and the right-eye screen DR. The at least one processor 16 in the VR device 1 is further configured to control the left-eye screen DL to display the left-eye image and control the right-eye screen DR to display the right-eye image. The communication device 13 in the VR device 1 is further configured to receive the left-eye image to be displayed on the left-eye screen DL and the right-eye image to be displayed on the right-eye screen DR sent by the terminal 2. The left-eye image includes a first part and a second part; a resolution of the first part of the left-eye image is a first resolution, and the first part of the left-eye image is used to be displayed in the fixation area 120 of the left-eye screen DL; a resolution of the second part of the left-eye image is a second resolution, and the second part of the left-eye image is a part of the left-eye image other than the first part; and the first resolution is greater than the second resolution. The right-eye image includes a first part and a second part; a resolution of the first part of the right-eye image is a third resolution, and the first part of the right-eye image is used to be displayed in the fixation area 120 of the right-eye screen DR; a resolution of the second part of the right-eye image is a fourth resolution, and the second part of the right-eye image is a part of the right-eye image other than the first part; and the third resolution is greater than the fourth resolution.

After rendering the left-eye image to be displayed and the right-eye image to be displayed, the terminal 2 may then send the rendered left-eye image and the rendered right-eye image to the VR device 1 to be displayed by the VR device 1. Since the resolutions of the left-eye screen DL and the right-eye screen DR of the VR device 1 may be set to be high values, when the rendered left-eye image and the rendered right-eye image are displayed on the VR device 1, a high-definition display effect may be achieved.

In some other embodiments, referring to FIG. 2, the VR device 1 further includes a display device 12, and the display device 12 includes the left-eye screen DL and the right-eye screen DR (e.g., as shown in FIG. 8).

The at least one processor 16 in the VR device 1 is configured to: determine the fixation area 120 of the left-eye screen DL and the fixation area 120 of the right-eye screen DR according to the fixation point position 120' on the screen viewed by the dominant eye of the user; render a first part of a left-eye image to be displayed on the left-eye screen DL at a first resolution, and render a second part of the left-eye image at a second resolution, the first part of the left-eye image being a part of the left-eye image to be displayed in the fixation area 120 of the left-eye screen DL, the second part of the left-eye image being a part of the left eye image other than the first part, and the first resolution being greater than the second resolution; render a first part of a right-eye image to be displayed on the right-eye screen DR at a third resolution, and render a second part of the right-eye image at a fourth resolution, the first part of the right-eye image being a part of the right-eye image to be displayed in the fixation area 120 of the right-eye screen DR, the second part of the right-eye image being a part of the right-eye image other than the first part, and the third resolution being greater than the fourth resolution. The at least one processor 16 is further configured to: control the left-eye screen DL to display the rendered left-eye image, and control the right-eye screen DR to display the rendered right-eye image. A resolution of an image to be displayed in the fixation area 120 of the screen viewed by the dominant eye of the user is greater than resolutions of images to be displayed in other areas of the left-eye screen DL and the right-eye screen DR.

The VR device 1 may not only be able to render the left-eye image to be displayed and the right-eye image to be displayed, but may also be able to display the rendered left-eye image and the rendered right-eye image. Therefore, the VR device 1 is highly integrated, small in size and portable.

In some embodiments, the at least one processor 16 in the VR device 1 is configured to acquire an eyeball image of the dominant eye of the user according to a control instruction sent by the terminal 2. In some other embodiments, the at least one processor 16 in the VR device 1 is configured to determine the dominant eye of the user, and acquire the eyeball image of the dominant eye of the user according to the determined result.

In some embodiments, the at least one processor 16 in the VR device 1 is configured to control the left-eye screen DL and the right-eye screen DR to display the dominant eye test image.

In some embodiments, referring to FIGS. 3A and 3B, the left-eye screen DL and the right-eye screen DR in the VR device 1 are two parts of a display screen 12' that do not overlap; or, the left-eye screen DL and the right-eye screen DR are two separate display screens 12'.

As for the description of the components of the VR device described above, reference may be made to all relevant contents of the processes involved in the embodiments of the image processing method described above, and details will not be repeated here.

In some embodiments, the VR device 1 may be divided into functional modules according to the embodiments of the image processing method described above. For example, the functional modules may be divided according to functions; or, two or more functions may be integrated into one processing module. The integrated modules may be implemented in a form of hardware or software functional modules. It will be noted that, the division of modules in the embodiments of the present disclosure is exemplary, and is only a division according to logical functions, and there may be other division manners in actual implementation.

Figure 14:
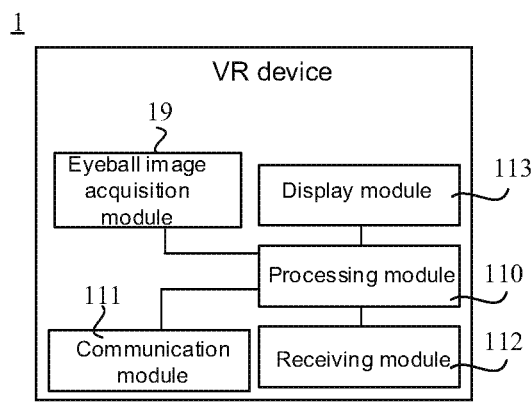
FIG. 14 is a structural diagram of yet another VR device, in accordance with some embodiments of the present disclosure.

In a case where the functional modules are divided according to functions, as shown in FIG. 14, some embodiments of the present disclosure further provide a VR device 1. The VR device 1 includes an eyeball image acquisition module 19 and at least one processing module 110. The eyeball image acquisition module 19 is configured to acquire eyeball image(s) of the dominant eye(s) of the user, the dominant eye(s) including at least one of the left eye and right eye of the user. The processing module(s) 110 are configured to calculate a fixation point position(s) 120' on the screen(s) viewed by the dominant eye(s) of the user according to the eyeball image(s). In some other embodiments, the processing module(s) 110 are further configured to determine a fixation area 120 of a left-eye screen DL and a fixation area 120 of a right-eye screen DR according to the fixation point position(s) 120', and render a left-eye image to be displayed on the left-eye screen DL according to the fixation area 120 of the left-eye screen DL, and render a right-eye image to be displayed on the right-eye screen DR according to the fixation area 120 of the right-eye screen DR.

In some embodiments, as shown in FIG. 14, the VR device 1 further includes a communication module 111. The communication module 111 is configured to send the fixation point position(s) 120' to the terminal 2, and the fixation point position(s) 120' are used to determine the fixation area 120 of the left-eye screen DL and the fixation area 120 of the right-eye screen DR.

In some embodiments, as shown in FIG. 14, the VR device 1 further includes a receiving module 112 and a display module 113. The receiving module 112 is configured to receive the left-eye image to be displayed on the left-eye screen DL and the right-eye image to be displayed on the right-eye screen DR. The display module 113 is configured to display the left-eye image on the left-eye screen DL and display the right-eye image on the right-eye screen DR. In some other embodiments, the receiving module 112 is further configured to receive a control instruction sent by the terminal 2, and acquire the eyeball image of the dominant eye of the user according to the control instruction.

As for the description of the functional modules above, reference may be made to all relevant contents of processes involved in the embodiments of the image processing method described above, and details will not be repeated here.

Referring to FIGS. 5A to 5C, the embodiments of the present disclosure further provides a terminal 2, which includes a memory 21 and at least one processor 22. The memory 21 is configured to store a computer program.

The at least one processor 22 is configured to execute the computer program stored in the memory 21 when the terminal 2 operates, so as to cause the terminal 2 to execute the image processing methods as shown in FIGS. 6A, 6B, 12A and 12B.

In some embodiments, referring to FIG. 5B, the terminal 2 further includes the display screen 12', and the display screen 12' includes the left-eye screen DL and the right-eye screen DR (referring to FIG. 8).

The at least one processor 22 in the terminal 2 is further configured to control the left-eye screen DL to display a rendered left-eye image, and control the right-eye screen DR to display a rendered right-eye image.

In this structure, the terminal 2 may be mounted on, for example, referring to FIG. 11, the bracket 114 in the VR device 1.

In some other embodiments, referring to FIGS. 5A to 5C, the terminal 2 further includes a communication device 23, which is configured to send the rendered left-eye image and the rendered right-eye image to the VR device 1 to be displayed by the VR device 1. In this case, the communication device 23 may be referred to as a first communication device.

In this structure, the display device 12 in the VR device 1 is used to display the rendered left-eye image and the rendered right-eye image.

In some embodiments, the at least one processor 22 in the terminal 2 is further configured to determine the dominant eye of the user. In this structure, the terminal 2 may determine the dominant eye of the user through human-computer interaction.

In some other embodiments, a communication device 23 in the terminal 2 is configured to send a control instruction to the VR device 1 according to the determined dominant eye of the user. The control instruction is used to control the VR device 1 to acquire the eyeball image of the dominant eye, and the eyeball image is used to determine the fixation point position 120'. In this case, the communication device 23 may be referred to as a second communication device.

Figure 5D:
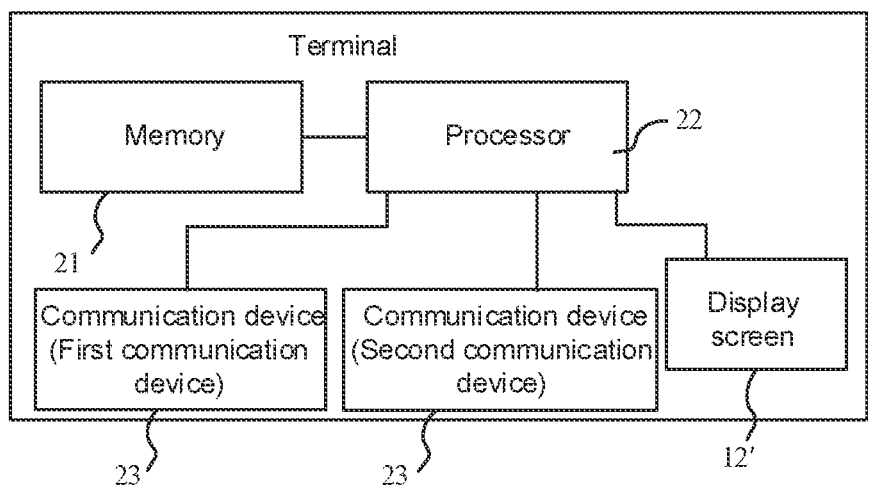
FIG. 5D is a structural diagram of yet another terminal, in accordance with some embodiments of the present disclosure.

In some embodiments, the first communication device and the second communication device are the same communication device 23. In some other embodiments, referring to FIG. 5D, the first communication device and the second communication device are two identical or different communication devices 23.

In some embodiments, the at least one processor 22 in the terminal 2 is further configured to respectively control the left-eye screen DL and the right-eye screen DR to display a dominant eye test image.

In some other embodiments, the first communication device in the terminal 2 is further configured to send the dominant eye test image to the VR device 1 to be displayed by the VR device 1.

The dominant eye test image is used to determine the dominant eye of the user. In a case where the terminal 2 includes the left-eye screen DL and the right-eye screen DR and/or VR device 1 includes the left-eye screen DL and the right-eye screen DR, the dominant eye test image may be used to help the user determine the dominant eye thereof, which is convenient and quick.

In some embodiments, the terminal 2 may be divided into functional modules according to the embodiments of the image processing method described above. For example, the functional modules may be divided according to functions; or, two or more functions may be integrated into one processing module. The integrated modules may be implemented in a form of hardware or software functional modules. It will be noted that, the division of modules in the embodiments of the present disclosure is exemplary, and is only a division according to logical functions, and there may be other division manners in actual implementation.

Figure 15:
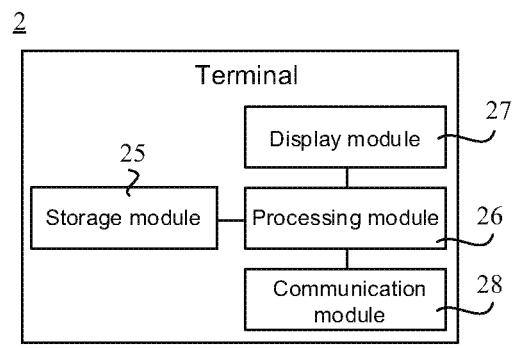
FIG. 15 is a structural diagram of yet another terminal, in accordance with some embodiments of the present disclosure.

In a case where the functional modules is divided according to the functions, as shown in FIG. 15, some embodiments of the present disclosure further provide a terminal 2. The terminal 2 includes a storage module 25 and at least one processing module 26. The storage module 25 is configured to store a computer program. The at least one processing module 26 is configured to execute the computer program stored in the storage module 25 when the terminal 2 operates, so as to cause the terminal 2 to execute the image processing method as described above. In some other embodiments, the at least one processing module 26 is further configured to control a left-eye screen DL to display a rendered left-eye image, and control a right-eye screen DR to display a rendered right-eye image. In some other embodiments, the at least one processing module 26 is further configured to determine the dominant eye of the user. In some other embodiments, the at least one processing module 26 is further configured to respectively control the left-eye screen DL and the right-eye screen DR to display a dominant eye test image.

In some other embodiments, the terminal 2 further includes a display module 27, and the display module 27 includes the left-eye screen DL and the right-eye screen DR.

In some other embodiments, the terminal 2 further includes a communication module 28. The communication module 28 includes, for example, a first communication module, and the first communication module is configured to send the rendered left-eye image and the rendered right-eye image to the VR device 1 to be displayed by the VR device 1. In some other embodiments, the first communication module is further configured to send the dominant eye test image to the VR device 1 to be displayed by the VR device 1.

In some other embodiments, the communication module 28 may further include a second communication module, and the second communication module is configured to send a control instruction to the VR device 1 according to the determined dominant eye of the user. The control instruction is used to control the VR device 1 to acquire an eyeball image of the dominant eye, and the eyeball image is used to determine a fixation point position 120'.

As for the description of the functional modules above, reference may be made to all relevant contents of steps involved in the embodiments of the image processing method described above, and details will not be repeated here.

Figure 16:
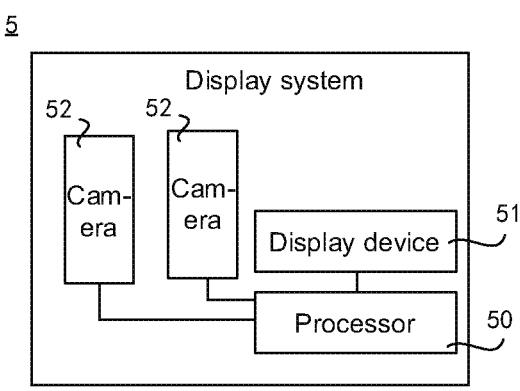
FIG. 16 is a structural diagram of a display system, in accordance with some embodiments of the present disclosure.

As shown in FIG. 16, the embodiments of the present disclosure further provide a display system 5, which includes at least one processor 50, a display device 51 and two cameras 52. The display device 51 includes a left-eye screen and a right-eye screen.

In some embodiments, the display system 5 may be, for example, a VR device 1, and the at least one processor 50 in the display system 5 may be understood as the at least one processor 16 in the VR device 1. Therefore, as for the description of the components in the display system 5, reference may be made to the description of the components in the VR device 1.

In some other embodiments, the display system 5 may be, for example, a combination of the VR device 1 and the terminal 2. In this case, as for the description of the display system 5, reference may be made to the description of the VR device 1 and the terminal 2.

The embodiments of the present disclosure further provide a computer-readable storage medium. The computer-readable storage medium stores therein a computer program, and when run on a terminal, the computer program causes the terminal to execute the image processing methods as shown in FIGS. 6A, 6B, 12A and 12B.

The computer-readable storage medium has the same beneficial effects as the corresponding image processing method described above, and details will not be repeated here.

In some embodiments, the computer-readable storage medium stores therein a computer program, and when run on the VR device 1, the computer program causes the VR device 1 to execute the image processing method as shown in FIGS. 6A, 6B, 12A, 12B and 13. The computer program has the same beneficial effects as the corresponding image processing method, and details will not be repeated here.

In some embodiments, the computer-readable storage medium stores therein a computer program, and when run on a display system 5, the computer program causes the display system 5 to execute the image processing method shown in FIG. 13. The computer program has the same beneficial effects as the corresponding image processing method, and details will not be repeated here.

Some embodiments of the present disclosure provide a computer-readable storage medium (e.g. a non-transitory computer-readable storage medium). The computer-readable storage medium has stored therein computer program instructions. When run on a processor, the computer program instructions cause the processor to execute one or more steps of the method as described in any of the above embodiments.

For example, the computer-readable storage medium may include, but is not limited to, a magnetic storage device (e.g., a hard disk, a floppy disk or a magnetic tape), an optical disk (e.g., a compact disk (CD), or a digital versatile disk (DVD)), a smart card, and a flash memory device (e.g., an erasable programmable read-only memory (EPROM)), a card, a stick or a key driver. Various computer-readable storage media described in the present disclosure may represent one or more devices and/or other machine-readable storage medium for storing information. The term "computer-readable storage medium" may include, but is not limited to, wireless channels and various other media capable of storing, containing and/or carrying instructions and/or data.

The above descriptions are merely specific implementations of the present disclosure, but the protection scope of the present disclosure is not limited thereto. Any changes or replacements that any person skilled in the art could conceive of within the technical scope disclosed by the present disclosure shall be included in the protection scope of the present disclosure. Therefore, the protection scope of the present disclosure shall be subject to the protection scope of the claims.

What is claimed is:

1. An image processing method, comprising:
    acquiring a fixation point position on a respective screen viewed by each of at least one dominant eye of a user, the at least one dominant eye including at least one of a left eye and a right eye of the user;
    determining a fixation area of a left-eye screen and a fixation area of a right-eye screen according to at least one fixation point position corresponding to the at least one dominant eye;
    rendering a first part of a left-eye image to be displayed on the left-eye screen at a first resolution, and rendering a second part of the left-eye image at a second resolution, the first part of the left-eye image being a part of the left-eye image to be displayed in the fixation area of the left-eye screen, the second part of the left-eye image being a part of the left-eye image other than the first part, and the first resolution being greater than the second resolution;
    rendering a first part of a right-eye image to be displayed on the right-eye screen at a third resolution, and rendering a second part of the right-eye image at a fourth resolution, the first part of the right-eye image being a part of the right-eye image to be displayed in the fixation area of the right-eye screen, the second part of the right-eye image being a part of the right-eye image other than the first part, and the third resolution being greater than the fourth resolution; wherein
    a resolution of an image to be displayed in a fixation area of the respective screen is greater than resolutions of images to be displayed in other areas of the left-eye screen and the right-eye screen;
    wherein the at least one dominant eye includes one dominant eye, the dominant eye being the left eye of the user, the image processing method further comprises: reducing the first resolution according to a level of the dominant eye to obtain the third resolution, and reducing the second resolution according to the level of the dominant eye to obtain the fourth resolution; or
    the at least one dominant eye includes one dominant eye, the dominant eye being the right eye of the user, the image processing method further comprises: reducing the third resolution according to a level of the dominant eye to obtain the first resolution, and reducing the fourth resolution according to the level of the dominant eye to obtain the second resolution.

2. The image processing method according to claim 1, wherein the at least one dominant eye includes the left eye of the user; the third resolution is greater than the second resolution and less than the first resolution, and/or the fourth resolution is less than the second resolution; or
    the at least one dominant eye includes the right eye of the user; the first resolution is greater than the fourth resolution and less than the third resolution, and/or the second resolution is less than the fourth resolution; or
    the at least one dominant eye includes the left eye and the right eye of the user; the third resolution is equal to the first resolution, and the fourth resolution is equal to the second resolution.

3. The image processing method according to claim 1, further comprising:
    displaying the rendered left-eye image on the left-eye screen, and displaying the rendered right-eye image on the right-eye screen; or
    sending the rendered left-eye image and the rendered right-eye image to a VR device to be displayed by the VR device.

4. The image processing method according to claim 1, further comprising:
    determining the at least one dominant eye of the user; and
    sending a control instruction to a VR device according to the at least one determined dominant eye of the user, so as to control the VR device to acquire at least one eyeball image of the at least one dominant eye, the at least one eyeball image being used to determine the at least one fixation point position.

5. The image processing method according to claim 1, further comprising:
    displaying a dominant eye test image on the left-eye screen and the right-eye screen, respectively; or
    sending the dominant eye test image to a VR device to be displayed by the VR device.

6. A terminal, comprising:
    a memory configured to store a computer program;
    at least one processor configured to execute the computer program stored in the memory when the terminal operates, so as to cause the terminal to perform the image processing method according to claim 1.

7. The terminal according to claim 6, further comprising:
    the left-eye screen and the right-eye screen, wherein the at least one processor is further configured to control the left-eye screen to display the rendered left-eye image, and control the right-eye screen to display the rendered right-eye image; or
    a first communication device configured to send the rendered left-eye image and the rendered right-eye image to a VR device to be displayed by the VR device.

8. The terminal according to claim 6, wherein the at least one processor is further configured to determine the at least one dominant eye of the user; and
    the terminal further comprises:
    a second communication device configured to send a control instruction to a VR device according to the determined at least one dominant eye of the user, the control instruction being used to control the VR device to acquire at least one eyeball image of the at least one dominant eye, and the at least one eyeball image being used to determine the at least one fixation point position.

9. A non-transitory computer-readable storage medium storing therein a computer program, wherein
    when run on a terminal, the computer program causes the terminal to perform the image processing method according to claim 1.

10. An image processing method, comprising:
    acquiring at least one eyeball image of at least one dominant eye of a user, the at least one dominant eye including at least one of a left eye and a right eye of the user; and
    calculating a fixation point position on a respective screen viewed by each of the at least one dominant eye according to the at least one eyeball image;
    sending at least one fixation point position corresponding to the at least one dominant eye to a terminal, the at least one fixation point position being used to determine a fixation area of a left-eye screen and a fixation area of a right-eye screen;
    determining a fixation area of a left-eye screen and a fixation area of a right-eye screen according to at least one fixation point position corresponding to the at least one dominant eye;

rendering a first part of a left-eye image to be displayed on the left-eye screen at a first resolution, and rendering a second part of the left-eye image at a second resolution, the first part of the left-eye image being a part of the left-eye image to be displayed in the fixation area of the left-eye screen, the second part of the left-eye image being a part of the left-eye image other than the first part, and the first resolution being greater than the second resolution;

rendering a first part of a right-eye image to be displayed on the right-eye screen at a third resolution, and rendering a second part of the right-eye image at a fourth resolution, the first part of the right-eye image being a part of the right-eye image to be displayed in the fixation area of the right-eye screen, the second part of the right-eye image being a part of the right-eye image other than the first part, and the third resolution being greater than the fourth resolution, wherein a resolution of an image to be displayed in a fixation area of the respective screen is greater than resolutions of images to be displayed in other areas of the left-eye screen and the right-eye screen; and displaying the rendered left-eye image on the left-eye screen, and displaying the rendered right-eye image on the right-eye screen;

wherein the at least one dominant eye includes one dominant eye, the dominant eye being the left eye of the user, the image processing method further comprises: reducing the first resolution according to a level of the dominant eye to obtain the third resolution, and reducing the second resolution according to the level of the dominant eye to obtain the fourth resolution; or the at least one dominant eye includes one dominant eye, the dominant eye being the right eye of the user, the image processing method further comprises: reducing the third resolution according to a level of the dominant eye to obtain the first resolution, and reducing the fourth resolution according to the level of the dominant eye to obtain the second resolution.

11. The image processing method according to claim 10, further comprising:

receiving the left-eye image to be displayed on the left-eye screen and the right-eye image to be displayed on the right-eye screen, wherein the left-eye image includes the first part and the second part, a resolution of the first part of the left-eye image is the first resolution, the first part of the left-eye image is used to be displayed in the fixation area of the left-eye screen, a resolution of the second part of the left-eye image is the second resolution, the second part of the left-eye image is a part of the left-eye image other than the first part, and the first resolution is greater than the second resolution; the right-eye image includes a first part and a second part, a resolution of the first part of the right-eye image is the third resolution, the first part of the right-eye image is used to be displayed in the fixation area of the right-eye screen, a resolution of the second part of the right-eye image is the fourth resolution, the second part of the right-eye image is a part of the right-eye image other than the first part, and the third resolution is greater than the fourth resolution; and displaying the left-eye image on the left-eye screen, and displaying the right-eye image on the right-eye screen.

12. The image processing method according to claim 10, further comprising:

acquiring the at least one eyeball image of the at least one dominant eye of the user includes:

receiving a control instruction sent by a terminal, and acquiring the at least one eyeball image of the at least one dominant eye of the user according to the control instruction; or determining the at least one dominant eye of the user, and acquiring the at least one eyeball image of the at least one dominant eye of the user according to a determined result.

13. A VR device, the VR device being used to perform the image processing method according to claim 10, the VR device comprising:

two cameras in one-to-one correspondence with the left eye and the right eye of the user, the cameras being configured to acquire eyeball images of eyes corresponding to the cameras; and at least one processor configured to control at least one camera corresponding to the at least one dominant eye of the user to work, and calculate the fixation point position on the respective screen viewed by each of the at least one dominant eye according to at least one eyeball image acquired by the at least one camera, the at least one dominant eye including at least one of the left eye and the right eye of the user;

the VR device further comprising:

a communication device configured to send at least one fixation point position corresponding to the at least one dominant eye to a terminal, the at least one fixation point position being used to determine a fixation area of a left-eye screen and a fixation area of a right-eye screen; or a left-eye screen and a right-eye screen, wherein the at least one processor is further configured to:

determine a fixation area of the left-eye screen and a fixation area of the right-eye screen according to at least one fixation point position corresponding to the at least one dominant eye;

render a first part of a left-eye image to be displayed on the left-eye screen at a first resolution, and render a second part of the left-eye image at a second resolution, the first part of the left-eye image being a part of the left-eye image to be displayed in the fixation area of the left-eye screen, the second part of the left-eye image being a part of the left-eye image other than the first part, and the first resolution being greater than the second resolution;

render a first part of a right-eye image to be displayed on the right-eye screen at a third resolution, and render a second part of the right-eye image at a fourth resolution, the first part of the right-eye image being a part of the right-eye image to be displayed in the fixation area of the right-eye screen, the second part of the right-eye image being a part of the right-eye image other than the first part, the third resolution being greater than the fourth resolution, and a resolution of an image to be displayed in a fixation area of the respective screen being greater than resolutions of images to be displayed in other areas of the left-eye screen and the right-eye screen; and control the left-eye screen to display the rendered left-eye image, and control the right-eye screen to display the rendered right-eye image;

wherein the at least one dominant eye includes one dominant eye, the dominant eye being the left eye of the user, the at least one processor is further configured to:
reduce the first resolution according to a level of the dominant eye to obtain the third resolution, and reducing the second resolution according to the level of the dominant eye to obtain the fourth resolution; or wherein the at least one dominant eye includes one dominant eye, the dominant eye being the right eye of the user, the at least one processor is further configured to:
reduce the third resolution according to a level of the dominant eye to obtain the first resolution, and reducing the fourth resolution according to the level of the dominant eye to obtain the second resolution.

14. An image processing method, comprising:
determining at least one dominant eye of a user, the at least one dominant eye including at least one of a left eye and a right eye of the user;
acquiring at least one eyeball image of the at least one dominant eye of the user;
obtaining a fixation point position on a respective screen viewed by each of the at least one dominant eye of the user;
determining a fixation area of a left-eye screen and a fixation area of a right-eye screen according to at least one fixation point position corresponding to the at least one dominant eye;
rendering a first part of a left-eye image to be displayed on the left-eye screen at a first resolution, and rendering a second part of the left-eye image at a second resolution, the first part of the left-eye image being a part of the left-eye image to be displayed in the fixation area of the left-eye screen, the second part of the left-eye image being a part of the left-eye image other than the first part, and the first resolution being greater than the second resolution;
rendering a first part of a right-eye image to be displayed on the right-eye screen at a third resolution, and rendering a second part of the right-eye image at a fourth resolution, the first part of the right-eye image being a part of the right-eye image to be displayed in the fixation area of the right-eye screen, the second part of the right-eye image being a part of the right-eye image other than the first part, and the third resolution being greater than the fourth resolution, wherein a resolution of an image to be displayed in a fixation area of the respective screen is greater than resolutions of images to be displayed in other areas of the left-eye screen and the right-eye screen; and
displaying the rendered left-eye image on the left-eye screen, and displaying the rendered right-eye image on the right-eye screen;
wherein the at least one dominant eye includes one dominant eye, the dominant eye being the left eye of the user, and the image processing method further comprises: reducing the first resolution according to a level of the dominant eye to obtain the third resolution; and reducing the second resolution according to the level of the dominant eye to obtain the fourth resolution; or
the at least one dominant eye includes one dominant eye, the dominant eye being the right eye of the user, and the image processing method further comprises: reducing the third resolution according to a level of the dominant eye to obtain the first resolution; and reducing the fourth resolution according to the level of the dominant eye to obtain the second resolution.

15. The image processing method according to claim 14, wherein
the at least one dominant eye includes the left eye of the user; the third resolution is greater than the second resolution and less than the first resolution, and/or the fourth resolution is less than the second resolution; or
the at least one dominant eye includes the right eye of the user; the first resolution is greater than the fourth resolution and less than the third resolution, and/or the second resolution is less than the fourth resolution; or
the at least one dominant eye includes the left eye and the right eye of the user; the third resolution is equal to the first resolution, and the fourth resolution is equal to the second resolution.

16. A display system, the display system being used to perform one or more steps of the image processing method according to claim 14, the display system comprising:
two cameras in one-to-one correspondence with the left eye and the right eye of the user, the cameras being configured to acquire eyeball images of eyes corresponding to the cameras;
the left-eye screen and the right-eye screen; and
at least one processor configured to:
control at least one camera corresponding to the at least one dominant eye of the user, and calculate the fixation point position on the respective screen according to the at least one eyeball image;
determine the fixation area of the left-eye screen and the fixation area of the right-eye screen according to the at least one fixation point position;
render the left-eye image to be displayed on the left-eye screen according to the fixation area of the left-eye screen, and render the right-eye image to be displayed on the right-eye screen according to the fixation area of the right-eye screen; and
control the left-eye screen to display the rendered left-eye image, and control the right-eye screen to display the rendered right eye-image; wherein
the at least one processor is configured to render the left-eye image to be displayed on the left-eye screen according to the fixation area of the left-eye screen, and render the right-eye image to be displayed on the right-eye screen according to the fixation area of the right-eye screen, includes the at least one processor is configured to:
render the first part of the left-eye image to be displayed on the left-eye screen at the first resolution, and render the second part of the left-eye image at the second resolution, the first part of the left-eye image being the part of the left-eye image to be displayed in the fixation area of the left-eye screen, the second part of the left-eye image being the part of the left-eye image other than the first part, and the first resolution being greater than the second resolution; and
render the first part of the right-eye image to be displayed on the right-eye screen at the third resolution, and render the second part of the right-eye image at the fourth resolution, the first part of the right-eye image being the part of the right-eye image to be displayed in the fixation area of the right-eye screen, the second part of the right-eye image being the part of the right-eye image other than the first part, the third resolution being greater than the fourth resolution, and the resolution of the image to be displayed in the fixation area of the respective screen being greater than the resolutions of the images to be displayed in the other areas of the left-eye screen and the right-eye screen;

wherein the at least one dominant eye includes one dominant eye, the dominant eye being the left eye of the user, the at least one processor is further configured to:

reduce the first resolution according to a level of the dominant eye to obtain the third resolution, and reducing the second resolution according to the level of the dominant eye to obtain the fourth resolution; or wherein the at least one dominant eye includes one dominant eye, the dominant eye being the right eye of the user, the at least one processor is further configured to:

reduce the third resolution according to a level of the dominant eye to obtain the first resolution, and reducing the fourth resolution according to the level of the dominant eye to obtain the second resolution.

\* \* \* \* \*